United States Patent
Zhang

(10) Patent No.: US 10,459,302 B2
(45) Date of Patent: Oct. 29, 2019

(54) ARRAY SUBSTRATE, DISPLAY PANEL AND DISPLAY DEVICE

(71) Applicant: XIAMEN TIANMA MICRO-ELECTRONICS CO., LTD., Xiamen (CN)

(72) Inventor: Lei Zhang, Xiamen (CN)

(73) Assignee: XIAMEN TIANMA MICRO-ELECTRONICS CO., LTD., Xiamen (CN)

( * ) Notice: Subject to any disclaimer, the term of this patent is extended or adjusted under 35 U.S.C. 154(b) by 0 days.

(21) Appl. No.: 15/635,014

(22) Filed: Jun. 27, 2017

(65) Prior Publication Data

US 2017/0293172 A1   Oct. 12, 2017

(30) Foreign Application Priority Data

Feb. 15, 2017   (CN) .......................... 2017 1 0081495

(51) Int. Cl.
*G02F 1/1368*   (2006.01)
*G02F 1/1362*   (2006.01)
(Continued)

(52) U.S. Cl.
CPC ...... *G02F 1/1368* (2013.01); *G02F 1/134309* (2013.01); *G02F 1/134363* (2013.01);
(Continued)

(58) Field of Classification Search
CPC ............. G02F 1/1368; G02F 1/134363; G02F 1/136209; G02F 1/136286; G02F 1/133707; G02F 2201/121; G02F 2201/122; G02F 2201/123; G02F 2001/13685; G02F 2001/134372; G02F 2201/124; G02F 2001/134345; G02F 1/134318

See application file for complete search history.

(56) References Cited

U.S. PATENT DOCUMENTS 4,968,119 A * 11/1990 Stewart ................. G02F 1/1368
349/43
8,274,616 B2 * 9/2012 Shin ................. G02F 1/136286
349/141

(Continued)

FOREIGN PATENT DOCUMENTS

| CN | 203480182 U | 3/2014 |
|---|---|---|
| CN | 104407475 A | 3/2015 |
| KR | 20080051627 A | 6/2008 |

*Primary Examiner* — Yasser A Abdelaziez
(74) *Attorney, Agent, or Firm* — Alston & Bird LLP

(57) ABSTRACT

The present disclosure discloses an array substrate, a display panel and a display device. The array substrate comprises a substrate; a plurality of scanning lines and a plurality of data lines located on one side of the substrate, the plurality of scanning lines are extended in a second direction, the plurality of data lines are extended in a first direction, the plurality of scanning lines intersect the plurality of data lines in an insulated manner; and a plurality of sub-pixels defined by the plurality of scanning lines and the plurality of data lines; where each of the plurality of sub-pixels includes a thin film transistor which comprises an active layer, a gate, a source and a drain, the active layer, the gate, the source and the drain are located on one side of the substrate. The active layer includes a channel region.

16 Claims, 26 Drawing Sheets

(51) Int. Cl.
*G02F 1/1343* (2006.01)
*G02F 1/1337* (2006.01)

(52) U.S. Cl.
CPC .. *G02F 1/136209* (2013.01); *G02F 1/136286* (2013.01); *G02F 1/133707* (2013.01); *G02F 2001/13685* (2013.01); *G02F 2001/134345* (2013.01); *G02F 2001/134372* (2013.01); *G02F 2201/121* (2013.01); *G02F 2201/122* (2013.01); *G02F 2201/123* (2013.01); *G02F 2201/124* (2013.01)

(56) References Cited

U.S. PATENT DOCUMENTS

| | | | | |
|---|---|---|---|---|
| 2002/0097364 | A1* | 7/2002 | Kwon | G02F 1/1368 349/139 |
| 2002/0139980 | A1* | 10/2002 | Yamazaki | G02F 1/1368 257/72 |

* cited by examiner

ARRAY SUBSTRATE, DISPLAY PANEL AND DISPLAY DEVICE

CROSS-REFERENCE TO RELATED APPLICATIONS

This application claims priority to the Chinese patent application No. CN201710081495.9 filed on Feb. 15, 2017 and titled "Array Substrate, Display Panel and Display Device", which is incorporated herein by reference in its entirety.

TECHNICAL FIELD

The present application relates to the field of a display technology, and more particularly, to an array substrate, a display panel including the array substrate and a display device including the display panel.

BACKGROUND

Liquid crystal display devices, having the advantages of no radiation, light and power saving, have been widely used in a variety of information, communications, consumer electronics products. The liquid crystal display device generally includes a display panel including an array substrate and a color film substrate disposed opposite to each other, and a liquid crystal layer disposed between the two substrates. The array substrate includes a scanning line and a data line, and the scanning line and the data line are insulated from each other to define a plurality of sub-pixels. Each of the sub-pixels includes a pixel electrode, a common electrode and a thin film transistor, and the pixel electrode is electrically connected to a drain of the thin film transistor. When being displayed, the thin film transistor connected to the scanning line is turned on by applying a scanning signal to the scanning line, and the data voltage applied to the data line charges the pixel electrode through the thin film transistor that is turned on such that an electric field is formed between the pixel electrode and the common electrode so as to drive the liquid crystal to rotate, thereby achieving the display of image.

With the continuous development of the display technology, the demands for high PPI (Pixels Per Inch, the number of pixels per inch), and even ultra-high PPI become increasingly higher.

However, with the continuous improvements of PPI in a display panel, pixel arrangements become denser, sizes of each sub-pixel are getting smaller, which not only present great challenges to the device design of the display panel, but also cause a lot of problems, for example, the pixel aperture ratios, which refers to a ratio between a area of the light passing through portion except for the wiring part and transistor part (Usually being hidden by the black matrix) of each of the sub-pixels and a whole area of each of the sub-pixels, are limited by process technology constraints such as the line width and spacing limits between ever-smaller adjacent sub-pixels, when a stable light exposure in the lithography process can not be achieved, thereby resulting in a poor exposure in a display panel. The higher the opening ratio is, the hither the efficiency of light passes.

SUMMARY

In view of the above, the present disclosure provides a technique to make a an array substrate, a display panel including the array substrate and a display device including the display panel.

In a first aspect, an embodiment of the present disclosure provides an array substrate, which includes a substrate; and a plurality of scanning lines and a plurality of data line, where the plurality of scanning lines and the plurality of data lines are located on one side of the substrate. The plurality of scanning lines are extended in a secondt direction, the plurality of data lines are extended in a first direction, and the plurality of scanning lines intersect the plurality of data lines intersect in an insulated manner; and a plurality of sub-pixels defined by the plurality of scanning lines and the plurality of data lines. Each of the plurality of sub-pixels comprises a thin film transistor which includes an active layer, a gate, a source and a drain, the active layer, the gate, the source and the drain are located on one side of the substrate. The active layer includes a channel region which is an region where the active layer and the gate overlap in the direction perpendicular to the array substrate. The channel region comprises two edges opposite to each other in the second direction. A first angle, between an extending direction of the two edges and the first direction, is greater than 0° and less than or equal to 40°.

In a second aspect, the embodiment of the present disclosure provides a display panel including the array substrate provided in the first aspect.

In a third aspect, the embodiment of the present disclosure further provides a display device including the display panel provided in the second aspect.

Compared with the conventional technology, the array substrate, the display panel, and the display device according to the present disclosure are configured such that the first angle is formed by the extending direction of two edges opposite to each other of the channel region of the thin film transistor in the second direction and the first direction, and the first angle is greater than 0° and less than or equal to 40°. In this way, during the fabrication of the array substrate, the relative length of the pattern corresponding to the homologous film layer structure in the thin film transistor of two adjacent sub-pixles becomes smaller in the exposure process procedures of forming the thin film transistor, since the extending direction of the channel region has a predetermined degree of tilt with respect to the first direction. Consequently, the amount of exposure between the patterns can be increased, thereby increasing the exposure stability and improving the success rate of production of the array substrate. In addition, since a part of the film layers of the thin film transistor in the sub-pixels also needs to be tilted after the channel is tilted, thus the overlapping area that the part of the film layers and other film layers on the array substrate is changed such that the aperture ratio is improved.

BRIEF DESCRIPTION OF DRAWINGS

In order to more clearly illustrate the technical solution in the embodiments of the present disclosure, the following drawings, which are intended to be used in the description of the embodiments, are briefly described. It will be apparent that the drawings in the following description are merely some exemplary embodiments of the present disclosure, and other drawings may be obtained from these drawings for a person skilled in the art without devoting any inventive work.

DETAILED DESCRIPTION

A clear and thorough description of the technical solutions described in the embodiments of the present disclosure will now be given in conjunction with the accompanying drawings in the embodiments of the present disclosure, and it will be apparent that the described embodiments are merely a part but not all of the embodiments of the disclosure. All other embodiments obtained by those of ordinary skill in the art based on the embodiments in the present disclosure without making creative work fall within the scope of the present disclosure.

The embodiment of the present disclosure provides an array substrate, which includes a substrate; a plurality of scanning lines and a plurality of data lines, where the plurality of scanning lines and the plurality of data lines are located on one side of the substrate. The plurality of scanning lines are extended in a second direction, the plurality of data lines are extended in a first direction, and the plurality of scanning lines intersect the plurality of data lines in an insulated manner; and a plurality of sub-pixels defined by the plurality of scanning lines and the plurality of data lines. Each of the sub-pixels includes a thin film transistor which includes an active layer, a gate, a source and a drain, the active layer, the gate, the source and the drain are located on one side of the substrate. The active layer includes a channel region, which is a region where the active layer and the gate overlap in the direction perpendicular to the array substrate. The channel region includes two edges opposite to each other in the second direction. A first angle, between the extending direction of the two edges and the first direction, is greater than 0° and less than or equal to 40°.

Figure 1:
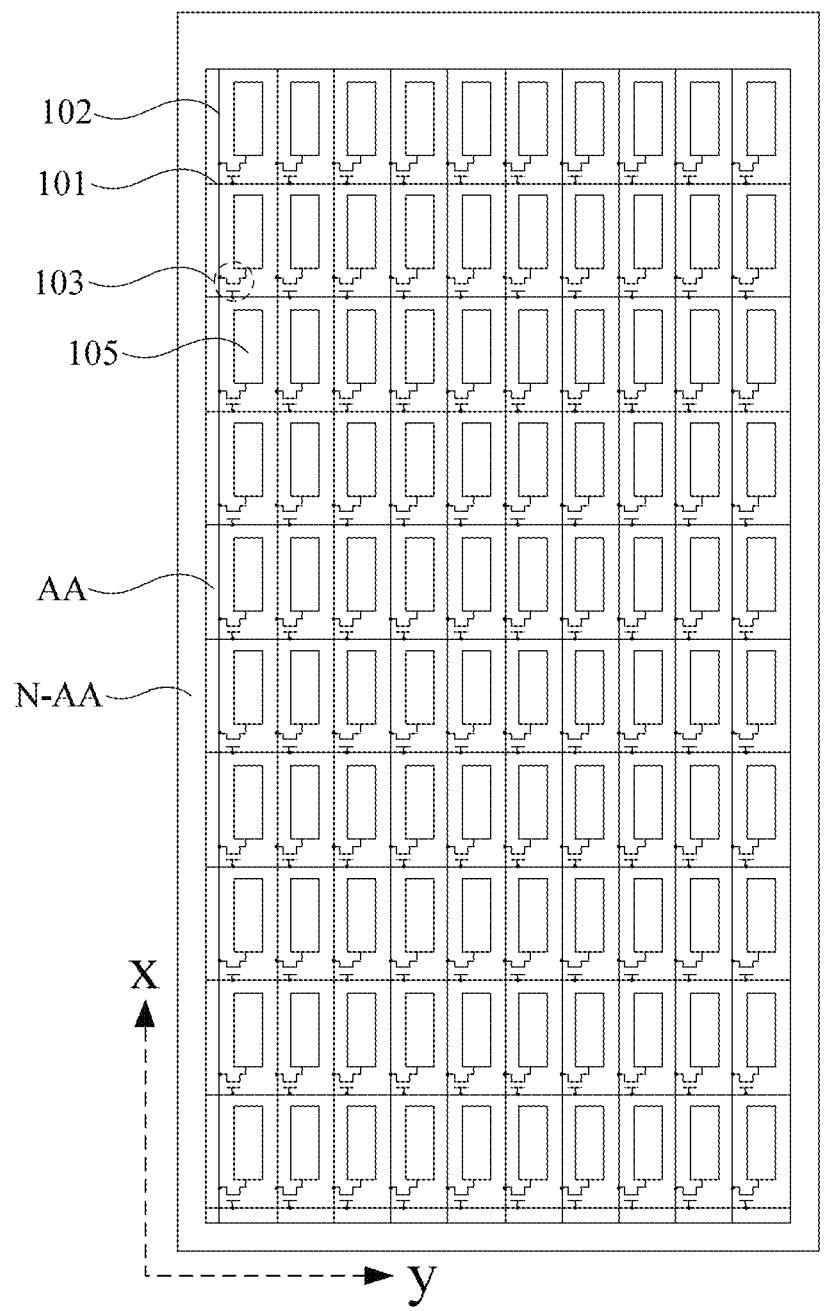
FIG. 1 is a schematic top view of an array substrate according to an embodiment of the present disclosure.
Figure 2:
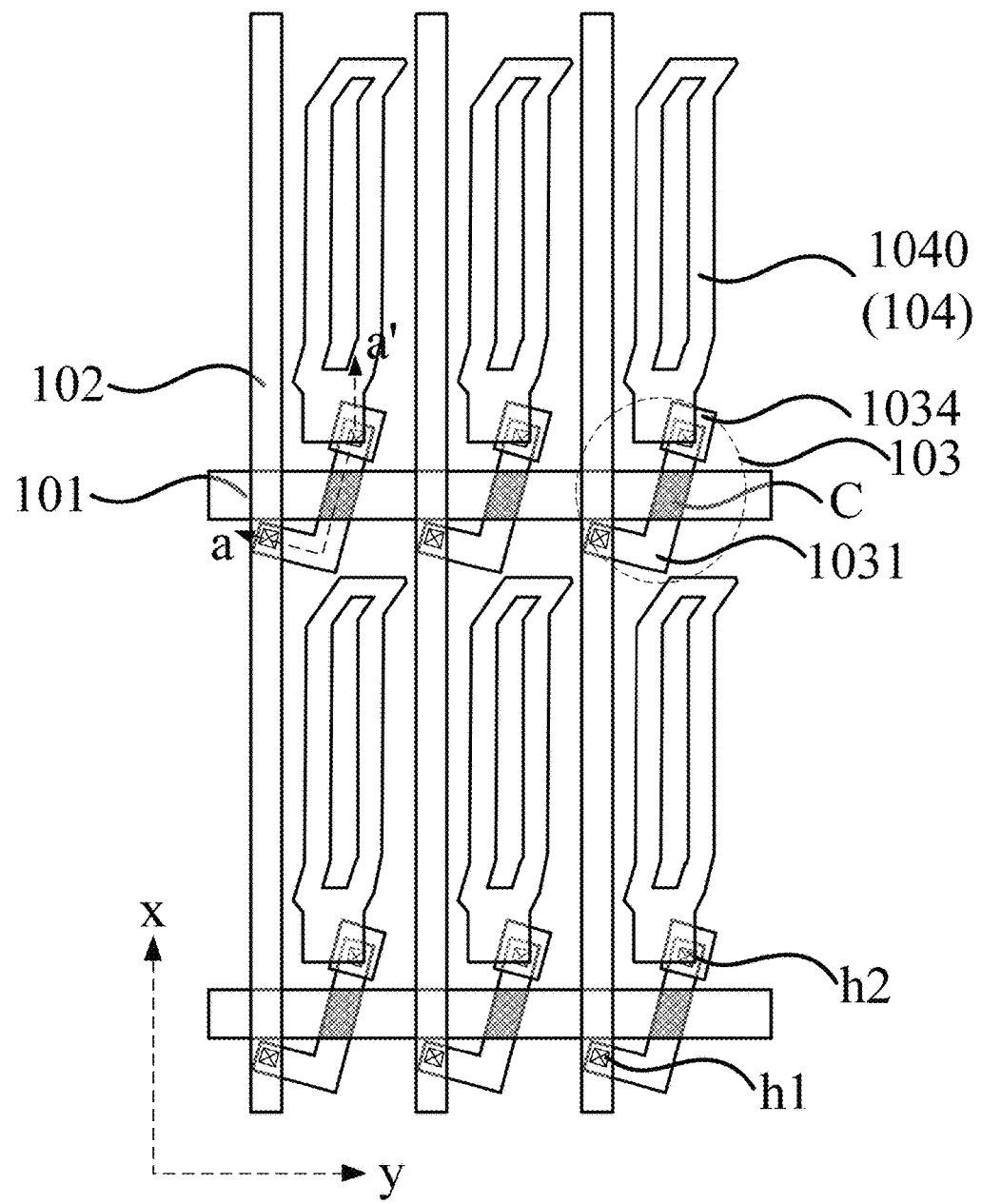
FIG. 2 is a schematic top view of a number of sub-pixels on the array substrate according to the embodiment of the present disclosure.
Figure 3:
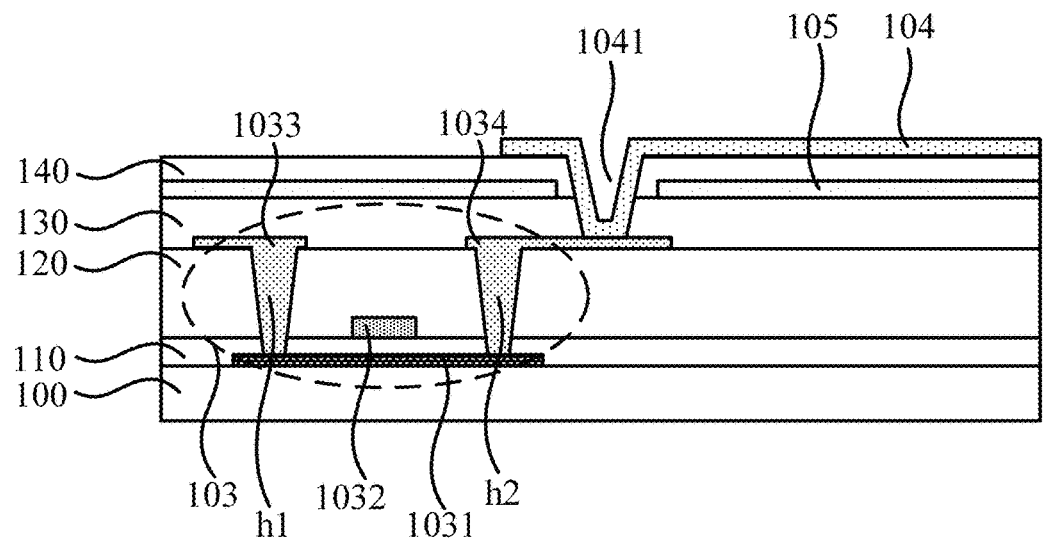
FIG. 3 is a schematic cross sectional view taken along a line aa' in FIG. 2.
Figure 4:
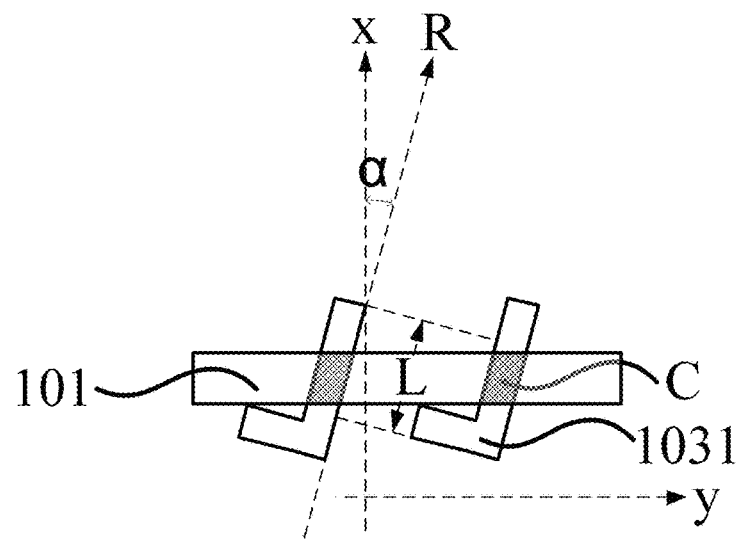
FIG. 4 is a schematic top view of a portion of film layers in FIG. 2.

With reference to FIGS. 1-4, FIG. 1 is a schematic top view of an array substrate according to an embodiment of the present disclosure, and FIG. 2 is a schematic top view of a few pixels on the array substrate according to the embodiment of the present disclosure, and FIG. 3 is a schematic cross sectional view along a line aa' in FIG. 2, and FIG. 4 is a schematic top view of a portion of the film layers in FIG. 2. The array substrate includes a substrate 100, a plurality of scanning lines 101 and a plurality of data lines 102 located on one side of the substrate 100, the plurality of scanning lines 101 are extended in a second direction y, and the plurality of data lines 102 are extended in a first direction x. Moreover, the plurality of scanning lines 101 and the plurality of data lines 102 intersect in an insulated manner to defend a plurality of sub-pixels. The sub-pixels includes a thin film transistor 103 which includes an active layer 1031, a gate 1032, a source 1033 and a drain 1034 that are located on one side of the substrate 100. The active layer 1031 includes a channel region C which is a region where the active layer 1031 and the gate 1032 overlay in the direction perpendicular to the array substrate. The channel region C includes two edges opposite to each other in the second direction y. There is a first angle α formed by the extending direction R of the two edges and the first direction x, and the first angle α is greater than 0° and less than or equal to 40°.

It is noted that, as shown, the thin film transistor 103 in the present embodiment is described as a top gate structure, in which the gate 1032 is located on one side of the active layer 1031 facing away from the substrate 100. In other alternative embodiments of the present disclosure, the thin film transistor may also be a bottom gate structure, namely, the gate is located on one side of the active layer near the substrate. In addition, as shown in FIGS. 2 and 3, when the thin film transistor 103 is a top gate structure, the source 1033 may be a part of the data line 102, the gate 1032 may be a part of the scanning line 101, and the source 1033 and the drain 1034 may be connected to the active layer 1031 through via holes h1 and h2, respectively.

Figure 5:
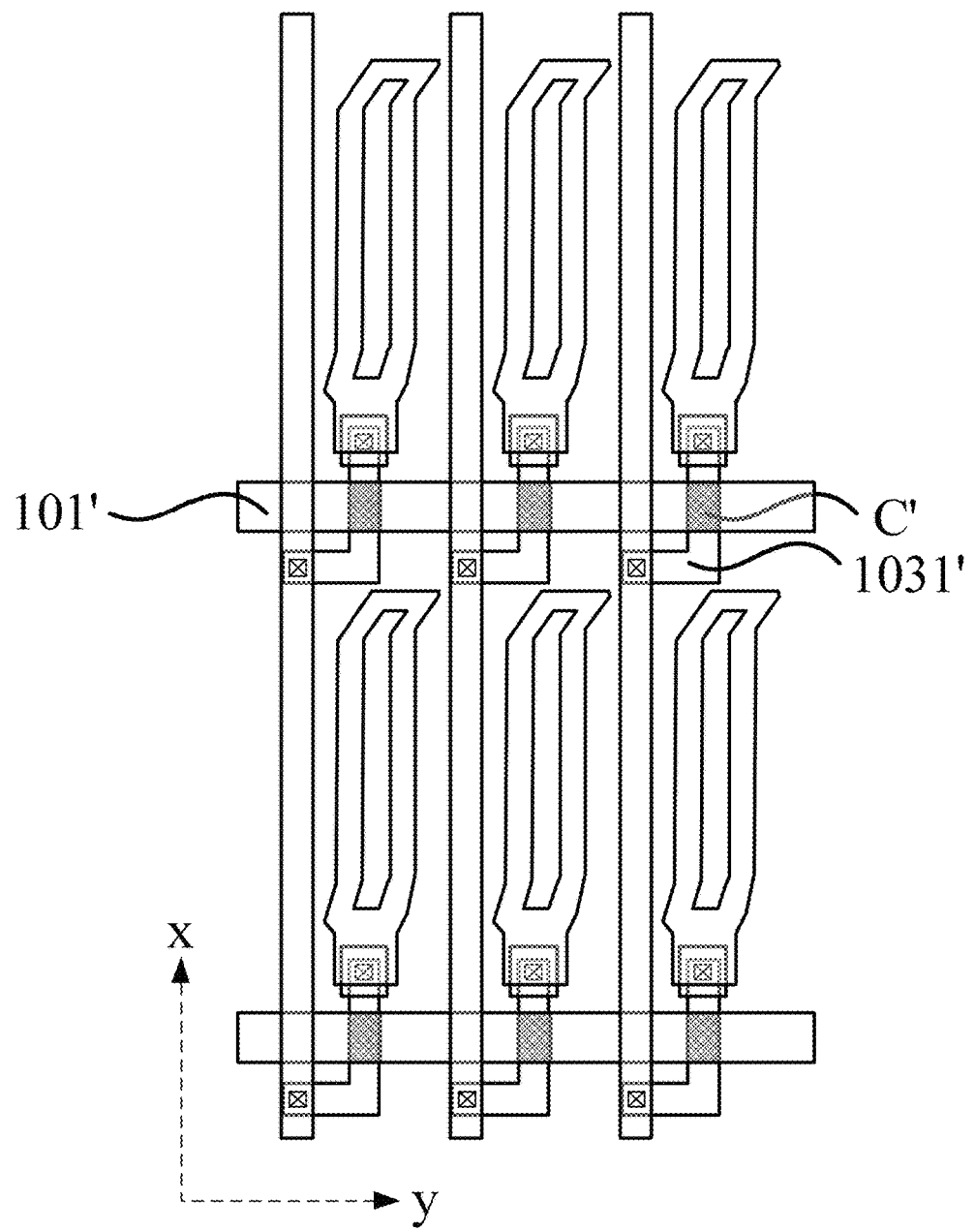
FIG. 5 is a top view of a number of sub-pixels on an array substrate according to the prior art.
Figure 6:
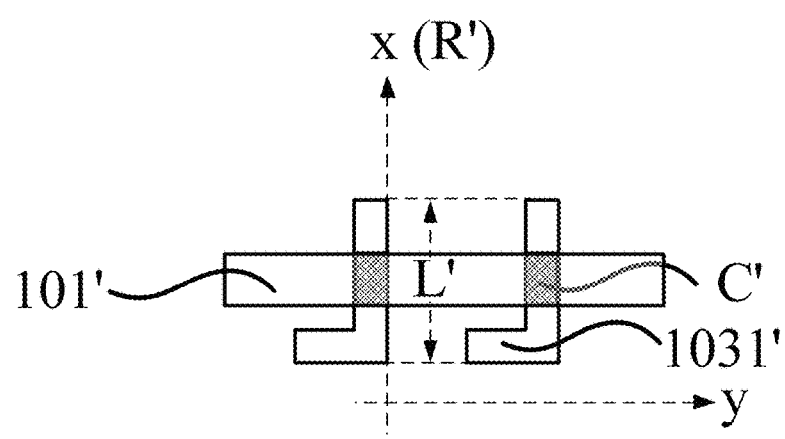
FIG. 6 is a schematic top view of a portion of the film layers in FIG. 5.

Compared with the existing technology, the array substrate according to the present embodiment is configured such that there is a first angle α formed by the extending direction R (hereinafter referred to as the extending direction R of the channel region C) of two edges opposite to each other of the channel region C of the thin film transistor 103 in a second direction y and the first direction x, and the first angle is greater than 0° and less than or equal to 40°. In this way, during the fabrication of the array substrate, the relative length of the pattern corresponding to the homologous film layer structure in the thin film transistor of two adjacent sub-pixels becomes smaller in the exposure process procedures of forming the thin film transistor, since the extending direction R of the channel region C has a certain degree of tilt with respect to the first direction x. Consequently, the amount of exposure light between the patterns can be increased, thereby increasing the exposure stability and improving the success rate of production of the array substrate. The process of forming the active layer 1041 is taken as an example in conjunction with FIGS. 4-6. FIG. 5 is a top view of a number of sub-pixels on an array substrate according to the existing technology, and FIG. 6 is a schematic top view of a portion of the film layers in FIG. 5. The area in which the active layer 103' and the scanning line 101' overlap in FIG. 6 is the corresponding channel region C', and the extending direction R' of the two edges opposite to each other in the second direction y of the channel region C' is the same as the first direction x. Assuming that the shape and size of the active layer patterns in FIG. 4 and FIG. 6 are consistent, the width of the pattern corresponding to the active layer 1031' in FIG. 6 is equal to 1 in the first direction x, and the relative length L' of the pattern corresponding to the active layer 1031' of the two adjacent sub-pixels in FIG. 6 is equal to 1. Whereas, the relative length L of the pattern corresponding to the active layer 1031 of the two adjacent sub-pixels in FIG. 4 satisfies the equation: L=L'×cos α. The first angle α is greater than 0° and less than or equal to 40°, therefore L<L'. As a result, in the present embodiment, the relative line width of the pattern corresponding to the active layer 1031 of the two adjacent sub-pixels becomes smaller, and the amount of exposure between the patterns is increased, thereby increasing the exposure stability and improving the success ratio of production of the array substrate.

In addition, a simulation study by the inventor based on the present embodiment has demonstrated that the aperture ratio of the array substrate has been increased as compared with that of the conventional array substrate, the reasons being, a portion of the film layers of the thin film transistors in the sub-pixels also needs to be tilted after the channel C is tilted, and thus the length of the film layers in the first direction is relatively reduced after tilting, and the overlapping area of the film layers and the other film layers on the array substrate is increased to so that the aperture ratio is increased. As the size of sub-pixels becomes smaller and smaller, the increase in aperture ratio is also a very important improvement and breakthrough.

Alternatively, in the above embodiment, the extending directions R of the two edges opposite to each other of the channel region C of any two adjacent sub-pixels in the second direction y are the same, that is, in the second direction y, the extending directions R of each channel region C in the same sub-pixel are the same, and the extending directions R of the channel region C are consistent with the inclination direction of the first direction x so as to facilitate the fabrication of the process.

Continue referring to FIGS. 2 and 3, in this embodiment, each sub-pixel further includes a pixel electrode 104 and a common electrode 105 (not shown in FIG. 2), the pixel electrode 104 is located on one side of the common electrode 105 facing away from the substrate 100. The pixel electrode 104 includes at least one stripe-like sub-electrode which is referred to herein as a pixel sub-electrode 1040. Two pixel sub-electrodes 1040 are schematically shown in FIG. 2, and the common electrode 105 may be a plate-like electrode. The gate of the thin film transistor 103 is electrically connected to the corresponding scanning line 101, its source is electrically connected to the corresponding data line 102, and its drain is electrically connected to the corresponding pixel electrode 104. As the array substrate is operated, the data line 102 corresponding to the source of the thin film transistor 103 charges and discharges the pixel electrode 104 corresponding to the drain 1034 through the thin film transistor 103 under the control of the corresponding gate line 101. Thus, an electric field is formed between the pixel electrode 104 and the common electrode 105, in order to achieve the display function.

It is noted that, as shown in FIG. 1, the array substrate generally includes a display area AA and a non-display area N-AA. The above plurality of sub-pixels are generally provided in the display area AA, and the non-display area N-AA may be provided with a drive circuit or the like. The drive circuit may be used to provide a scan signal for the scan line 101, a data signal for the data line 102, a common voltage signal for the common electrode, and the like. In addition, the array substrate may also include other structures required to realize the display, such as the insulating layers 110, 120, 130, 140 between the respective layer structures and the like, which may be made of the same or different materials, and will not be described here.

Figure 7:
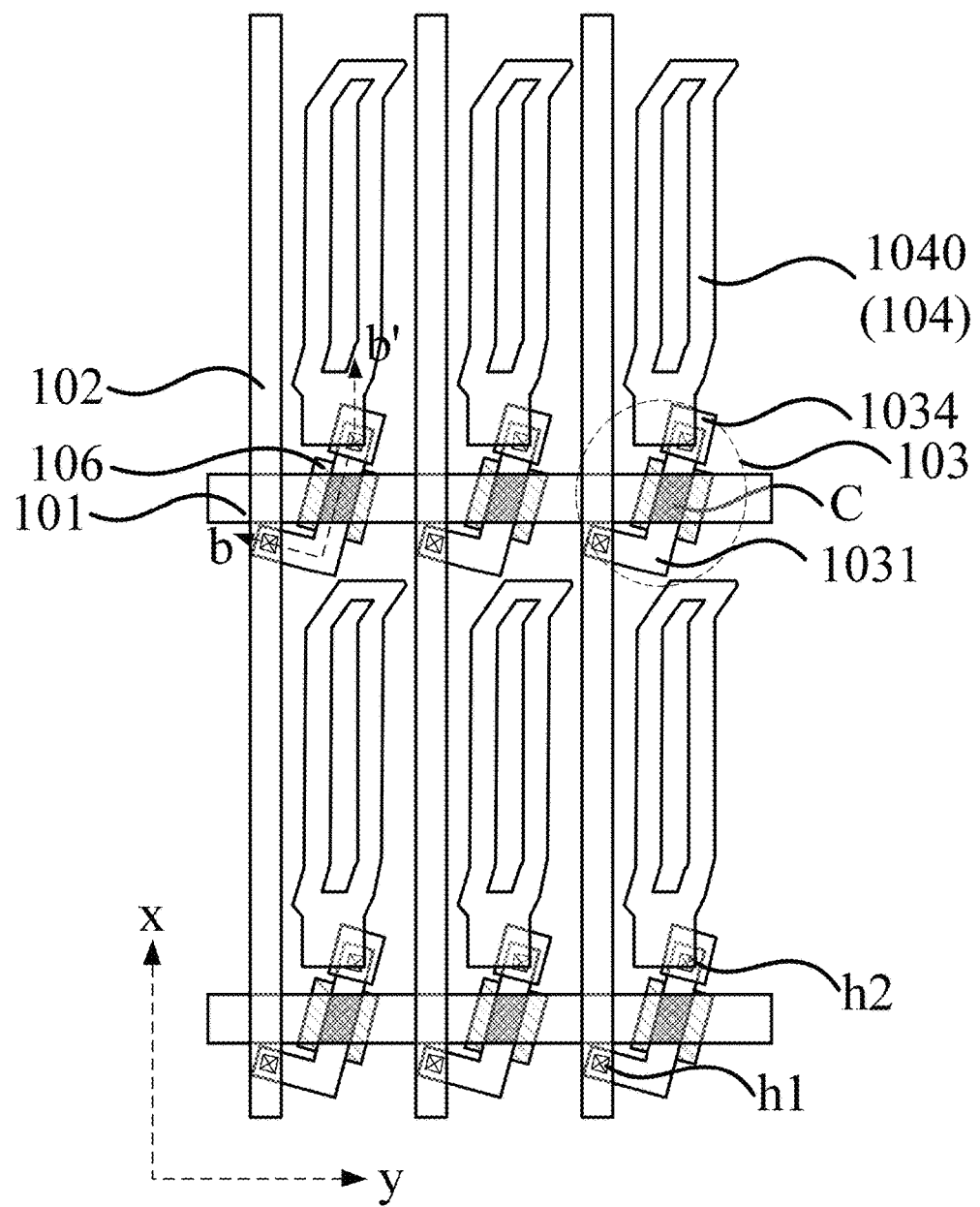
FIG. 7 is a schematic top view of a number of sub-pixels on another array substrate according to an embodiment of the present disclosure.
Figure 8:
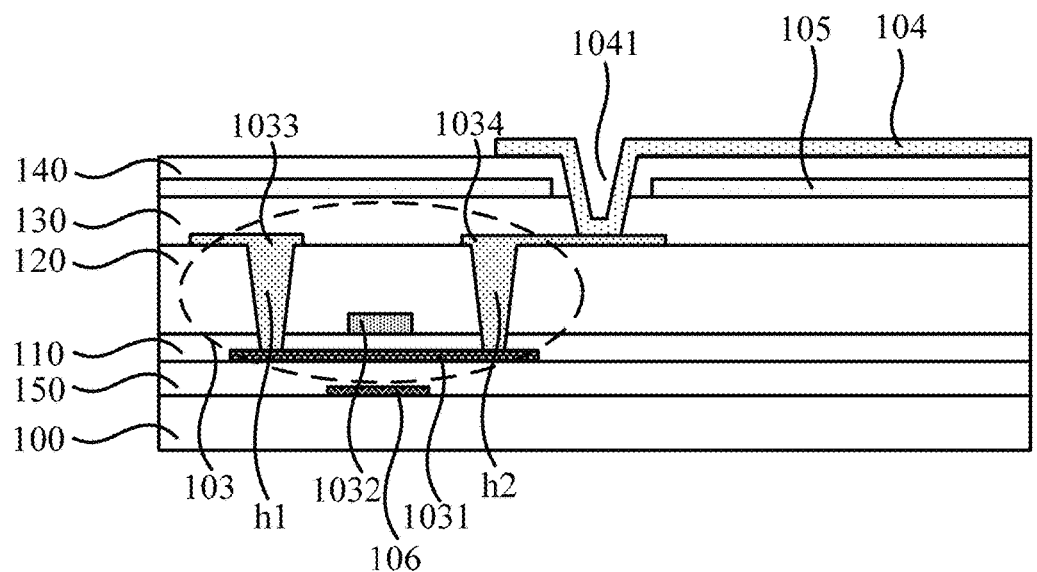
FIG. 8 is a schematic cross sectional view taken along a direction bb' in FIG. 7.
Figure 9:
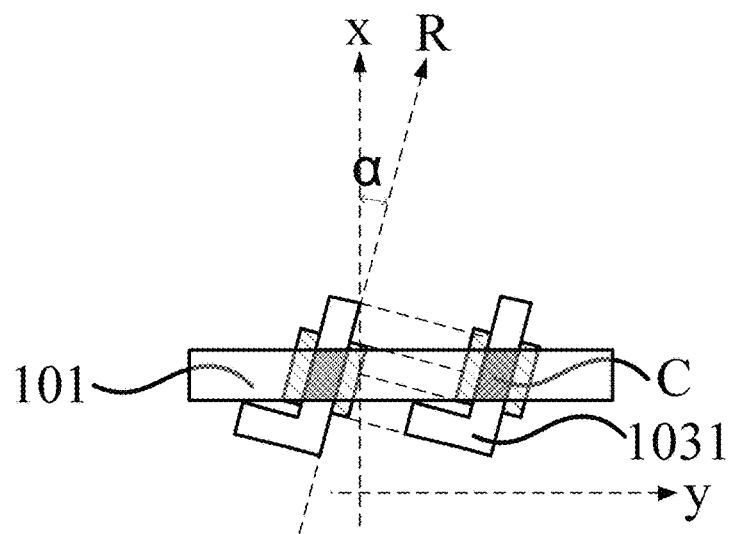
FIG. 9 is a schematic top view of a portion of the film layers in FIG. 7.

With reference to FIGS. 7-9, FIG. 7 is a schematic top view of a number of sub-pixels on another array substrate according to the embodiment of the present disclosure, FIG. 8 is a schematic sectional view taken along the direction bb' in FIG. 7, and FIG. 9 is schematic top view of a portion of the film layers in FIG. 7. In the present embodiment, the differences between the thin film transistor of the top gate structure and the array substrate shown in FIG. 2 are that the each of the plurality of sub-pixels may further include a light shield layer 106 positioned between the substrate 100 and the active layer 1031, the light shield layers 106 of the adjacent sub-pixels are insulated from each other to prevent the adverse effects of electrostatic buildup on the light shield layers 106 on the adjacent thin film transistors 103, and the orthographic projection of the light shield layer 106 on the substrate 100 completely covers the orthographic projection of the channel region C on the substrate 100. The function of the light shield layer 106 is to shield the light irradiating toward the channel region C of the active layer 1031 from the outside to prevent the adverse effects of the outside on the thin film transistor 103. It is to be understood that in this embodiment, the array substrate may also include a buffer layer 150 between the light shield layer 106 and the active layer 1031.

In the present embodiment, since there is the first angle α formed by the extending direction R of the channel region C and the first direction x, and the first angle α is greater than 0° and less than or equal to 40°, that is, the extending direction R of the channel region C has a certain degree of tilt with respect to the first direction x, then the light shield layer 106 corresponding to each channel region C is also tilted accordingly. Namely, the extending direction of the two edges opposite to each other of the light shield layer 106 in the second direction y is the same as the extending direction R of the channel region C. Therefore, the relative length of the pattern of the light shield layer 106 of the two adjacent sub-pixels becomes smaller, as shown in FIG. 9, and thus the exposure amount between patterns of the light shield layers is effectively increased.

Figure 10:
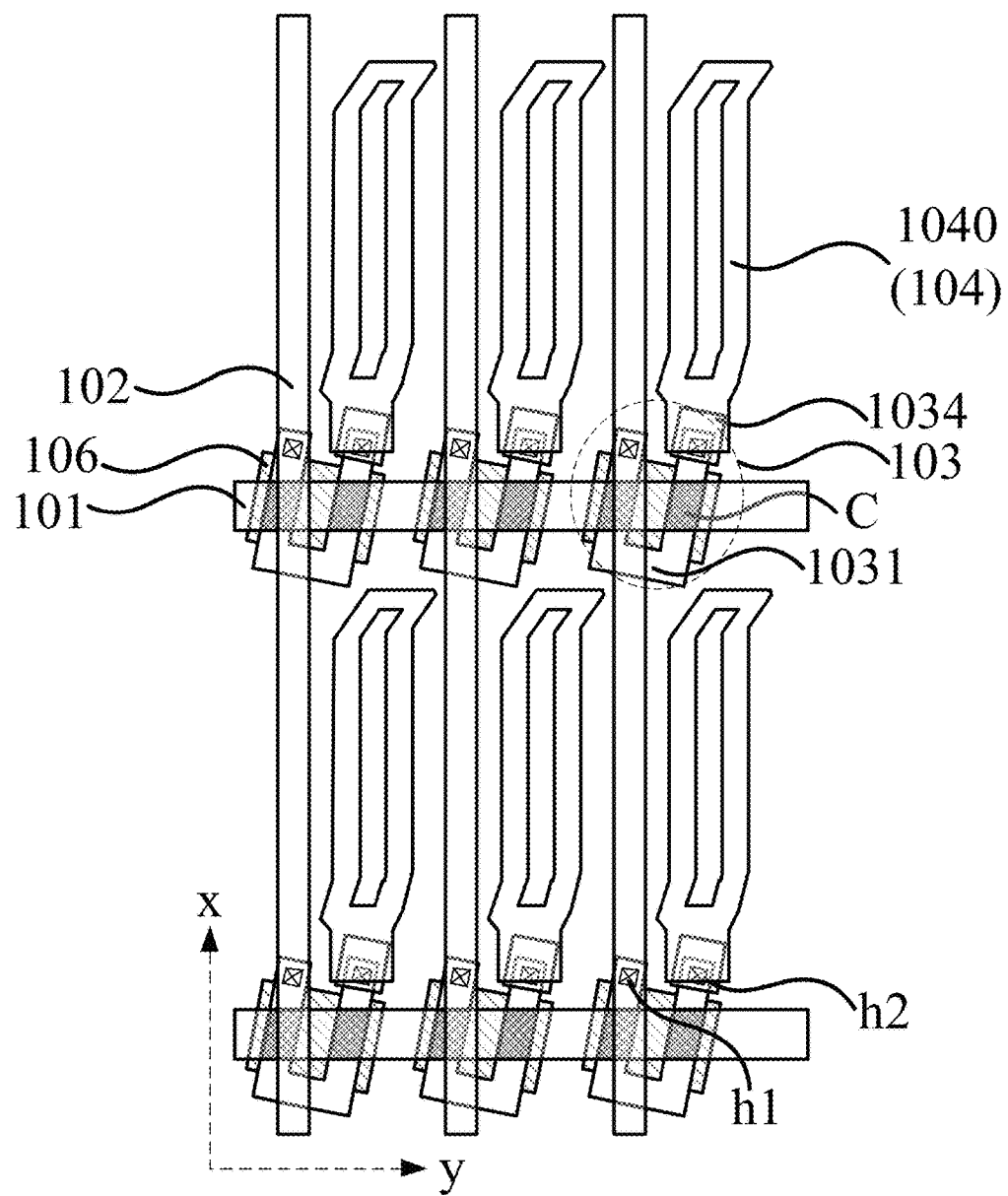
FIG. 10 is a schematic top view of a number of sub-pixels on another array substrate according to an embodiment of the present disclosure.
Figure 11:
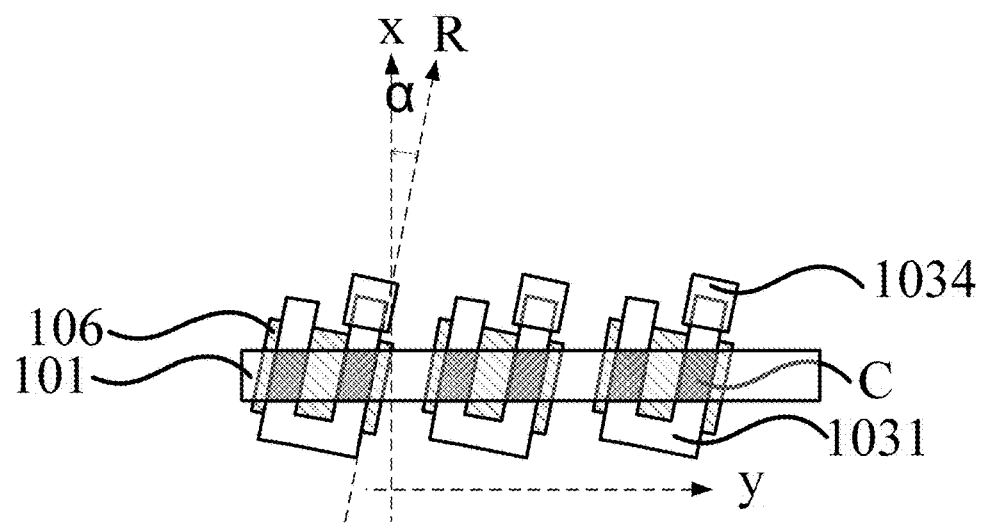
FIG. 11 is a schematic top view of a portion of the film layers in FIG. 10.

In the above embodiments, the active layer has an inverted L-shaped pattern, whereas in other alternative embodiments of the present disclosure, the active layer may also has a U-shaped pattern. Referring to FIGS. 10 and 11, FIG. 10 is a schematic top view of a number of sub-pixels on yet another array substrate according to an embodiment of the present disclosure, and FIG. 11 is a schematic top view of a portion of the film layers in FIG. 10. In the present embodiment, the thin film transistor 103 is a top gate structure, and each of the plurality of scanning lines 101 includes a gate. Namely, the gate may be a part of the scanning line 101. The active layer 1031 has the U-shaped pattern, and in the direction perpendicular to the array substrate, the U-shaped pattern includes two stripe-like sub-patterns opposite to each other in the second direction y and a connection pattern connecting the two stripe-like sub-patterns, the two stripe-like sub-patterns and the scanning lines 101 overlap to form two channel regions C. In the present embodiment, the active layer 1031 of the U-shaped pattern forms two channel regions C, which is equivalent to forming a thin film transistor of a double gate structure, and the leakage current of the thin film transistor can be reduced, particularly for the thin film transistors adopting low temperature poly-silicon (referred to as LTPS) technology. The level of leakage current is an important display performance index, and it is necessary to reduce the generation of leakage current. In the present embodiment, the distance between the corresponding patterns of homogeneous film layer structure in the thin film transistors of the two adjacent sub-pixels is relatively smaller for the active layer 1031 of the U-shaped pattern. For instance, the distance between the light shield layers of the adjacent sub-pixels and the distance between the active layers is smaller as compared to the embodiment shown in FIG. 7. Since the extending direction R of the channel region C is disposed to have a certain degree of tilt with respect to the first direction x, the relative length between the patterns of the adjacent sub-pixels becomes smaller and the exposure amount between the patterns is increased, thereby increasing the exposure stability, and improving the success rate of production of the array substrate. Further, according to the present embodiment, since the active layer 1031 has the U-shaped pattern, the relative length between a via hole pattern of the drain of the thin film transistor 103 and a via hole pattern of the source of the adjacent thin film transistor 103 becomes also smaller when the source and the drain of the thin film transistor 103 are connected to the active layer through a via hole (not shown), and as a result, the exposure stability at the time of the via hole fabrication procedures can be increased.

Figure 12:
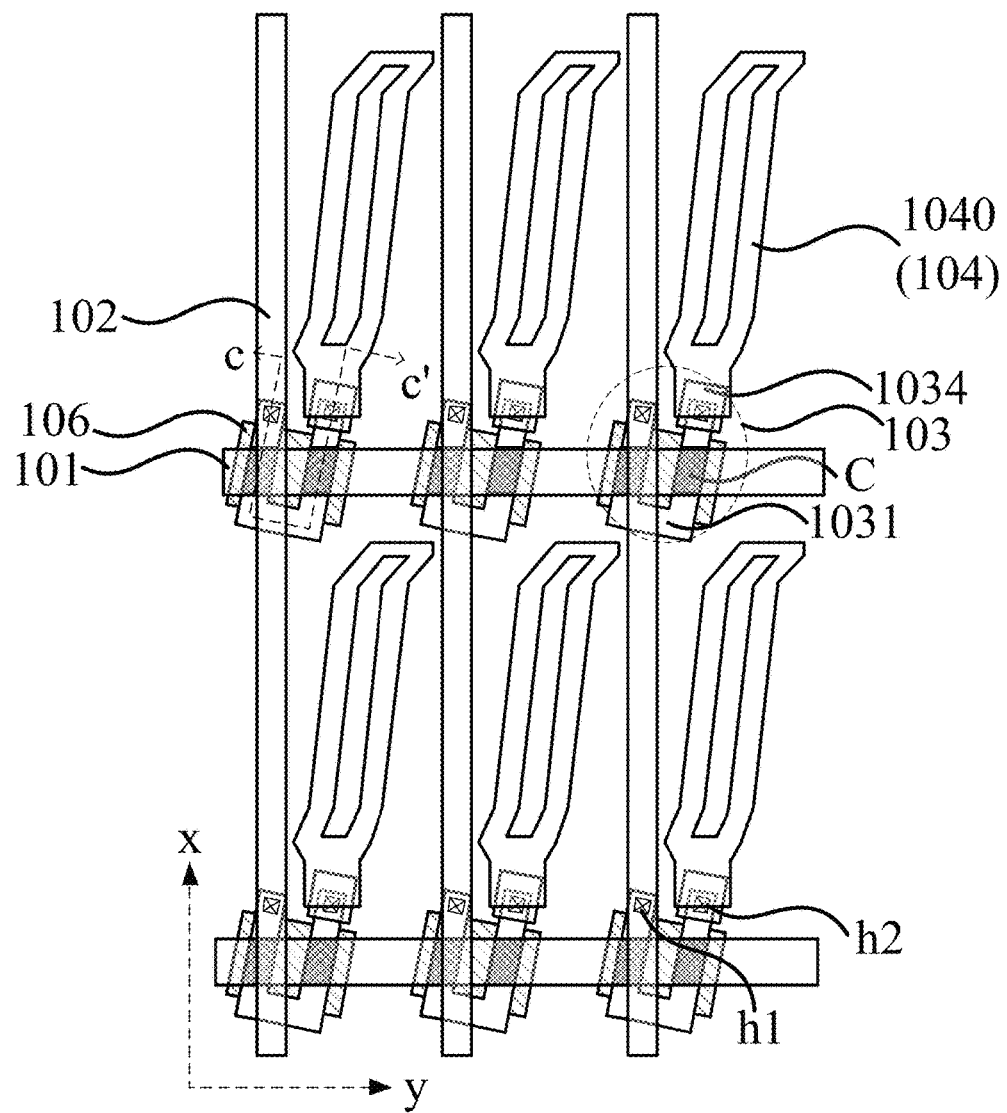
FIG. 12 is a schematic top view of a number of sub-pixels on another array substrate according to an embodiment of the present disclosure.
Figure 13:
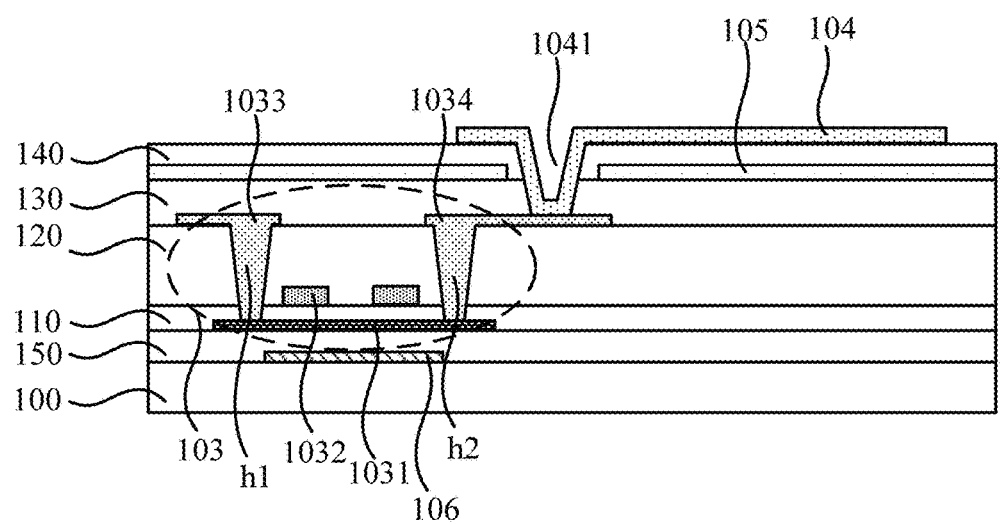
FIG. 13 is a schematic sectional view taken along a direction cc' in FIG. 12.
Figure 14:
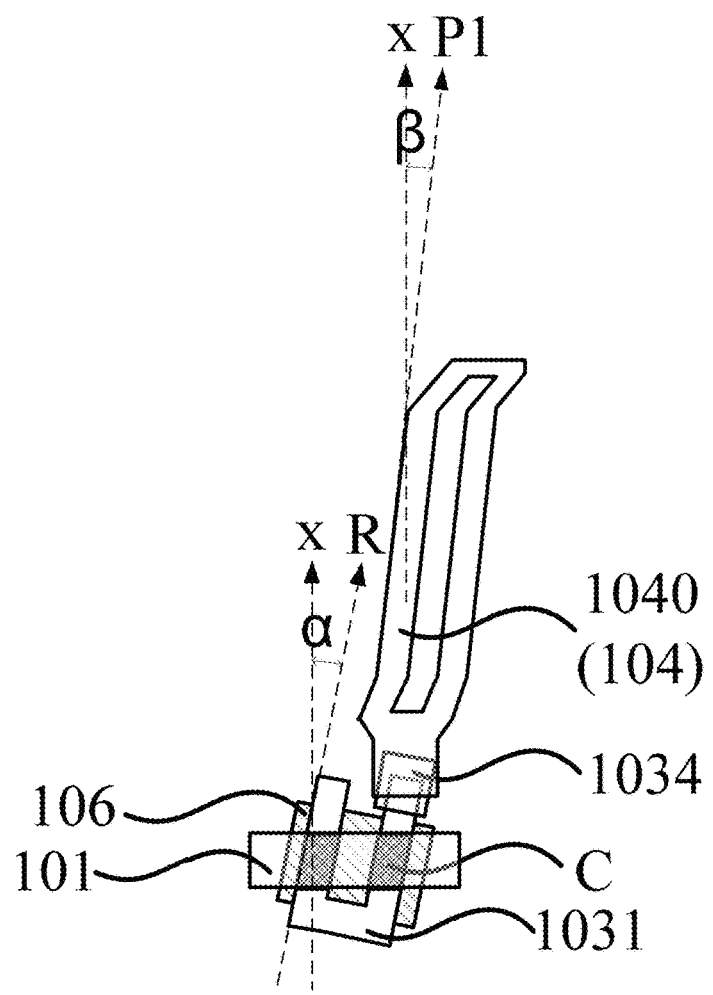
FIG. 14 is a schematic top view of a portion of the film layers in FIG. 10.

With reference to FIGS. 12-14, FIG. 12 is a schematic top view of a number of sub-pixels on another array substrate according to an embodiment of the present disclosure, FIG. 13 is a schematic sectional view taken along the line cc' in FIG. 12, and FIG. 14 is a schematic top view of a portion of the film layers in FIG. 10. In the present embodiment, each sub-pixel further includes a pixel electrode 104 and a common electrode 105 (not shown in FIG. 12), the pixel electrode 104 is located on one side of the common electrode facing away from the substrate 100 and includes at least one stripe-like sub-electrode, i.e., the pixel sub-electrode 1040. Two pixel sub-electrodes 1040 are schematically shown in FIG. 12, and the common electrode may be a plate-like electrode to form an array substrate of a Fringe Field Switching (FFS) mode. In contrast to the embodiment shown in FIG. 10, a second angle β, between the extending direction P1 of the pixel sub-electrode 1040 and the first direction x, is greater than 0° and less than or equal to 20°.

Figure 15:
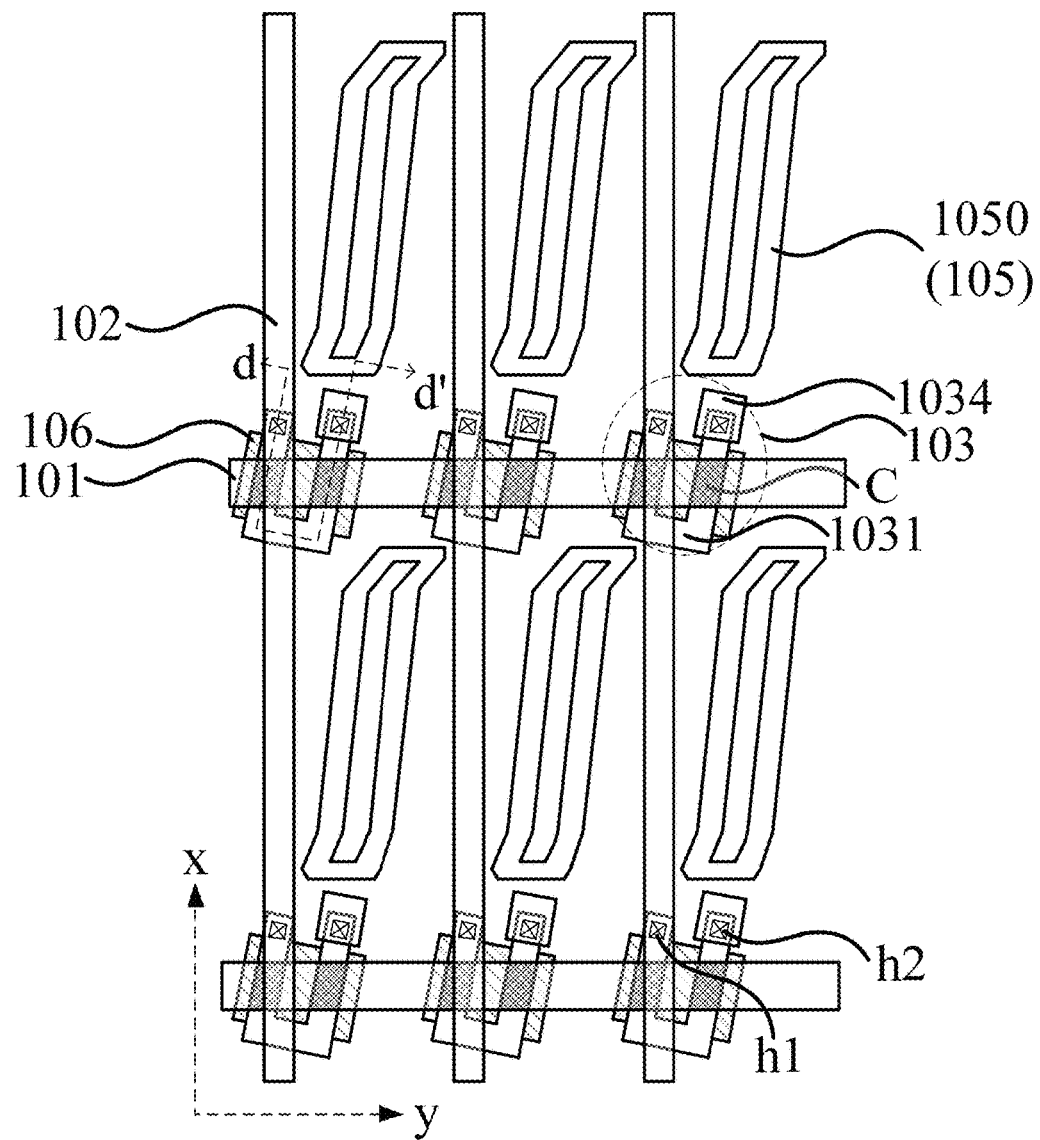
FIG. 15 is a schematic top view of a number of sub-pixels on another array substrate according to an embodiment of the present disclosure.
Figure 16:
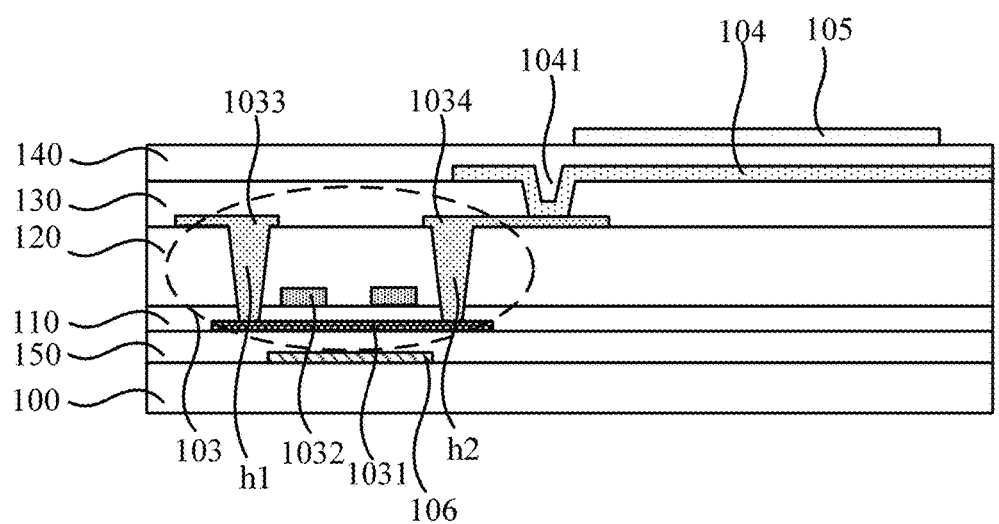
FIG. 16 is a schematic cross sectional view taken along a direction dd' in FIG. 15.
Figure 17:
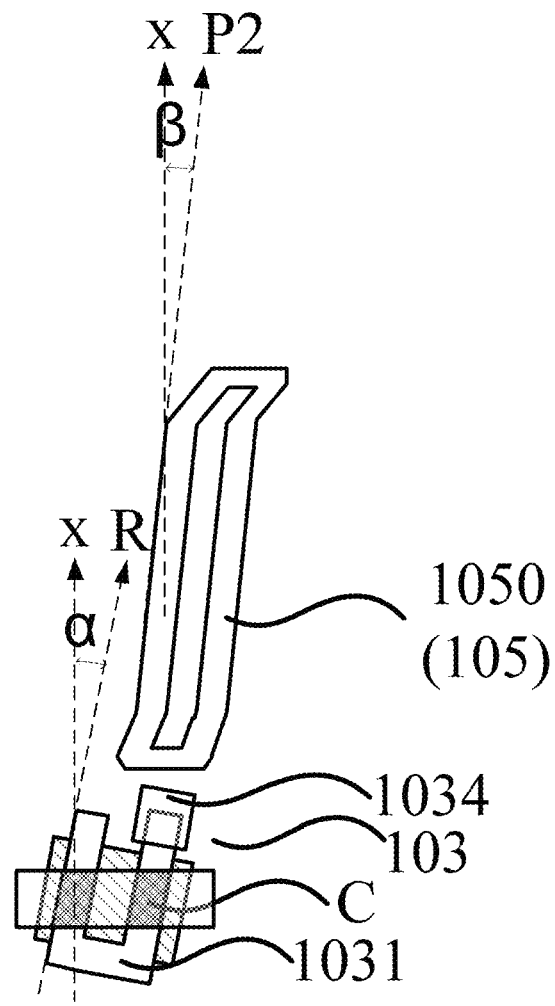
FIG. 17 is a schematic top view of a portion of the film layers in FIG. 15.

In the array substrate shown in FIGS. 12-14, the pixel electrode 104 is located on one side of the common electrode 105 (shown in FIG. 13) facing away from the substrate 100, and the pixel electrode 104 includes at least one stripe-like sub-electrode. In another alternative embodiment of the present disclosure, as shown in FIGS. 15-17, FIG. 15 is a schematic top view of a number of sub-pixels on another array substrate according to an embodiment of the present disclosure, FIG. 16 is a schematic sectional view taken along the line dd' in FIG. 15, and FIG. 17 is a schematic top view of a portion of the film layers in FIG. 15. It is possible that the common electrode 105 may be located on one side of the pixel electrode 104 (not shown) facing away from the substrate 100, and includes at least one stripe-like sub-electrode, i.e., the common sub-electrode 1050. The pixel electrode 104 may be a plate-like electrode to form an array substrate of a Fringe Field Switching (FFS) mode. A second angle β, between the extending direction P2 of the common sub-electrode 1050 and the first direction x, is greater than 0° and less than or equal to 20°.

Figure 18:
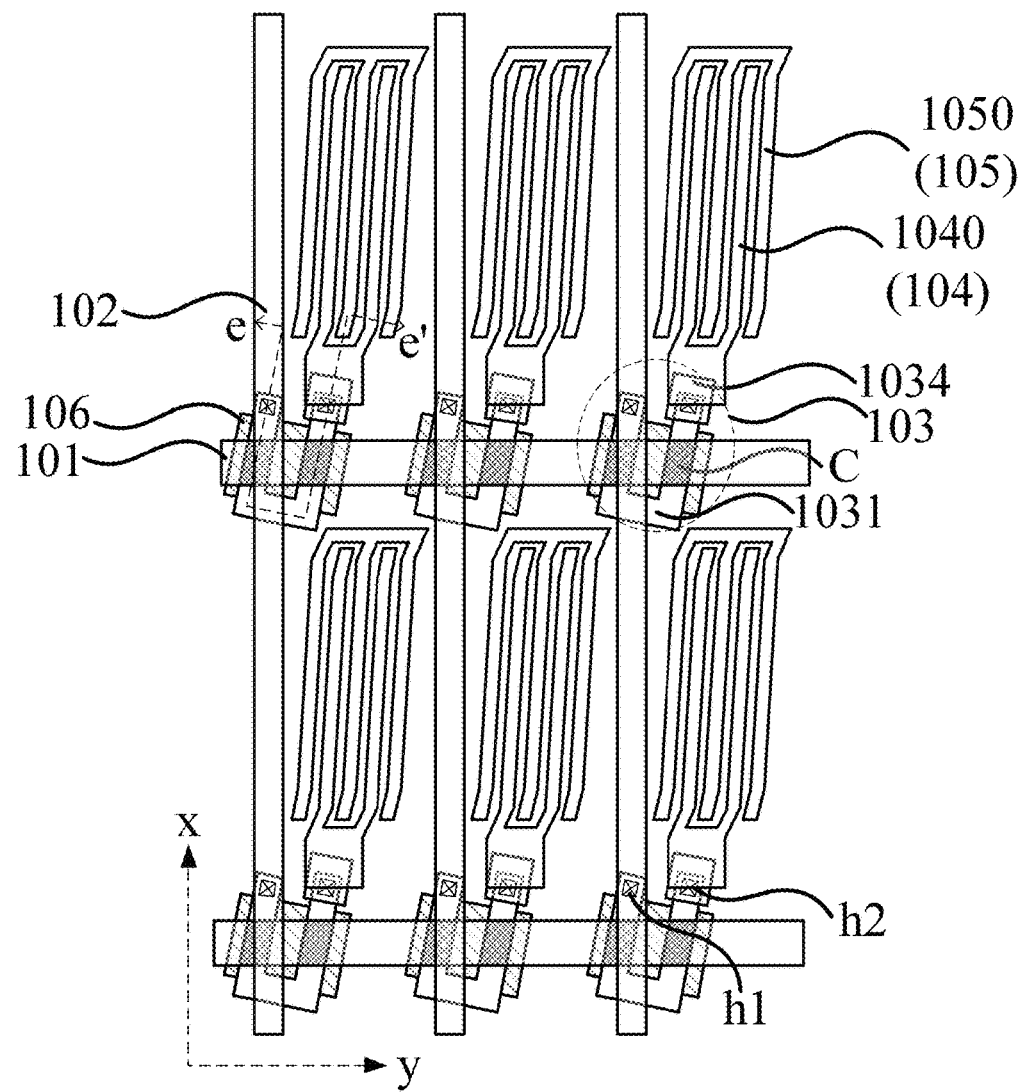
FIG. 18 is a schematic top view of yet another array substrate according to an embodiment of the present disclosure.
Figure 19:
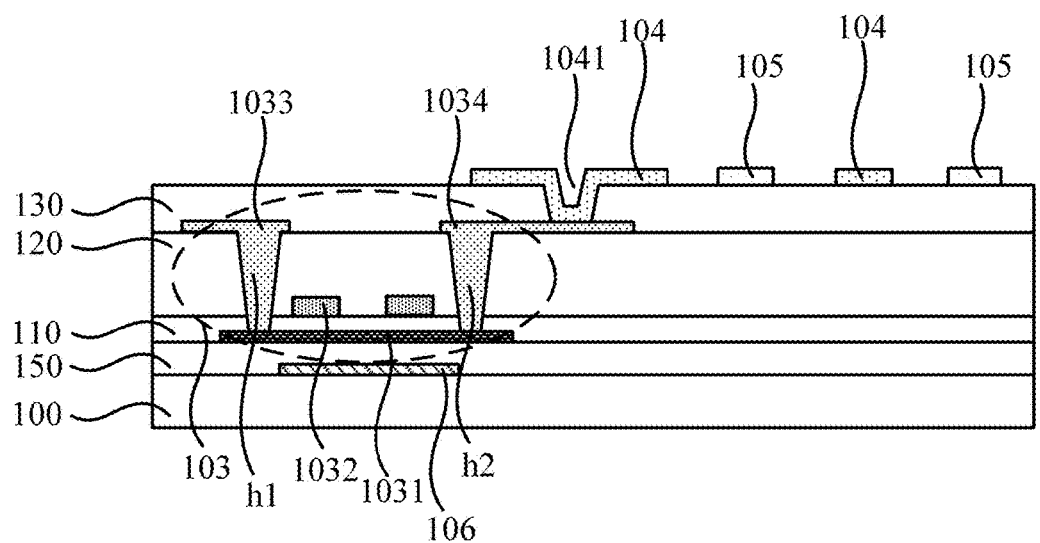
FIG. 19 is a schematic cross sectional view taken along a line ee' in FIG. 18.
Figure 20:
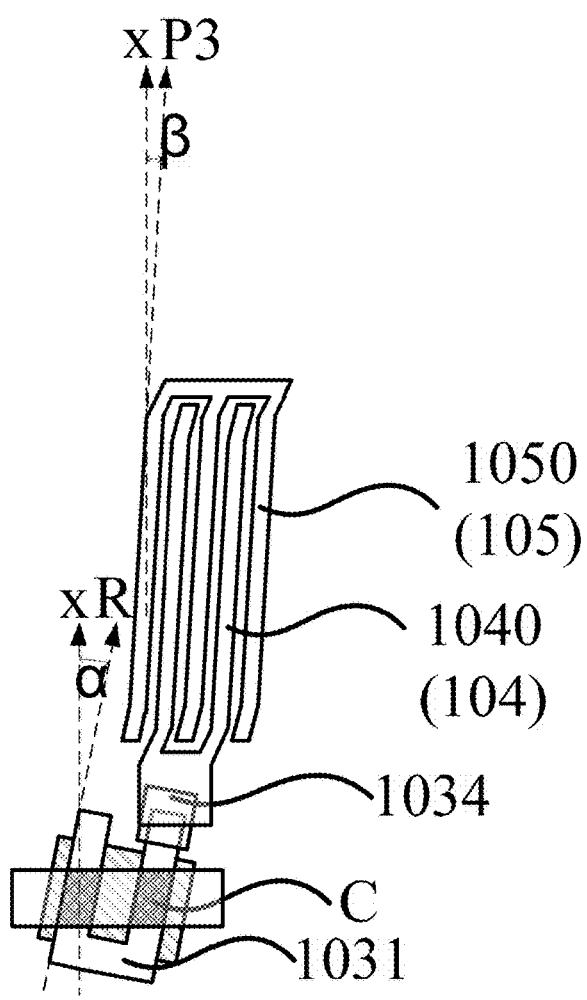
FIG. 20 is a schematic top view of a portion of the film layers in FIG. 18.

In another alternative embodiment of the present disclosure, as shown in FIGS. 18-20, FIG. 18 is a partial schematic top view of yet another array substrate according to an embodiment of the present disclosure, FIG. 19 is a schematic cross sectional view taken along the line ee' in FIG. 18, and FIG. 20 is a schematic top view of a portion of the film layer in FIG. 18. It is also possible that each of the pixel electrode 104 and the common electrode 105 include at least one sub-electrode??, and the at least one stripe-like sub-electrode of the pixel electrode 104 (pixel sub-electrode 1040) and the at least one stripe-like sub-electrode of the common electrodes 105 (common sub-electrodes 1050) are alternately arranged to form an array substrate of an In-Plane Switching (referring as IPS) mode. A second angle β, between the extending direction P3 of the pixel sub-electrode 1040 (the common sub-electrode 1050) and the first direction x, is greater than 0° and less than or equal to 20°. It is noted that in the present embodiment, the pixel electrode 104 and the common electrode 105 may be arranged in the same layer for the array substrate of the IPS mode, as shown in FIG. 19, and may be provided in different layers.

It is to be noted that in the embodiment shown in FIGS. 12 to 20, a second angle β is between the extending direction of the sub-electrode and the first direction x such that the extending direction of the stripe-like sub-electrode has a certain degree of tilt with respect to the first direction x to facilitate the widening of the display viewing angle. In addition, as shown in FIGS. 12 to 20, both ends of the stripe-like sub-electrode extending direction may be provided with corner portions to improve the resistance to display unevenness and to further enhance the display effect.

Alternatively, on the basis of the above embodiment, the extending direction R of the channel C is the same as the extending direction of the above-described stripe-like sub-electrode, that is, the first angle α is equal to the second angle β, which can cause the inclination angle of the corresponding pattern of the film layers structure in the thin film transistor with respect to the first direction x is consistent with the inclination angle of the stripe-like sub-electrode with respect to the first direction x, facilitating the design and fabrication of the process.

Further alternatively, the second angle β ranges from 5° to 10°. When the second angle β is in this range of 5° to 10°, the effect of widening the display viewing angle is better.

Figure 21:
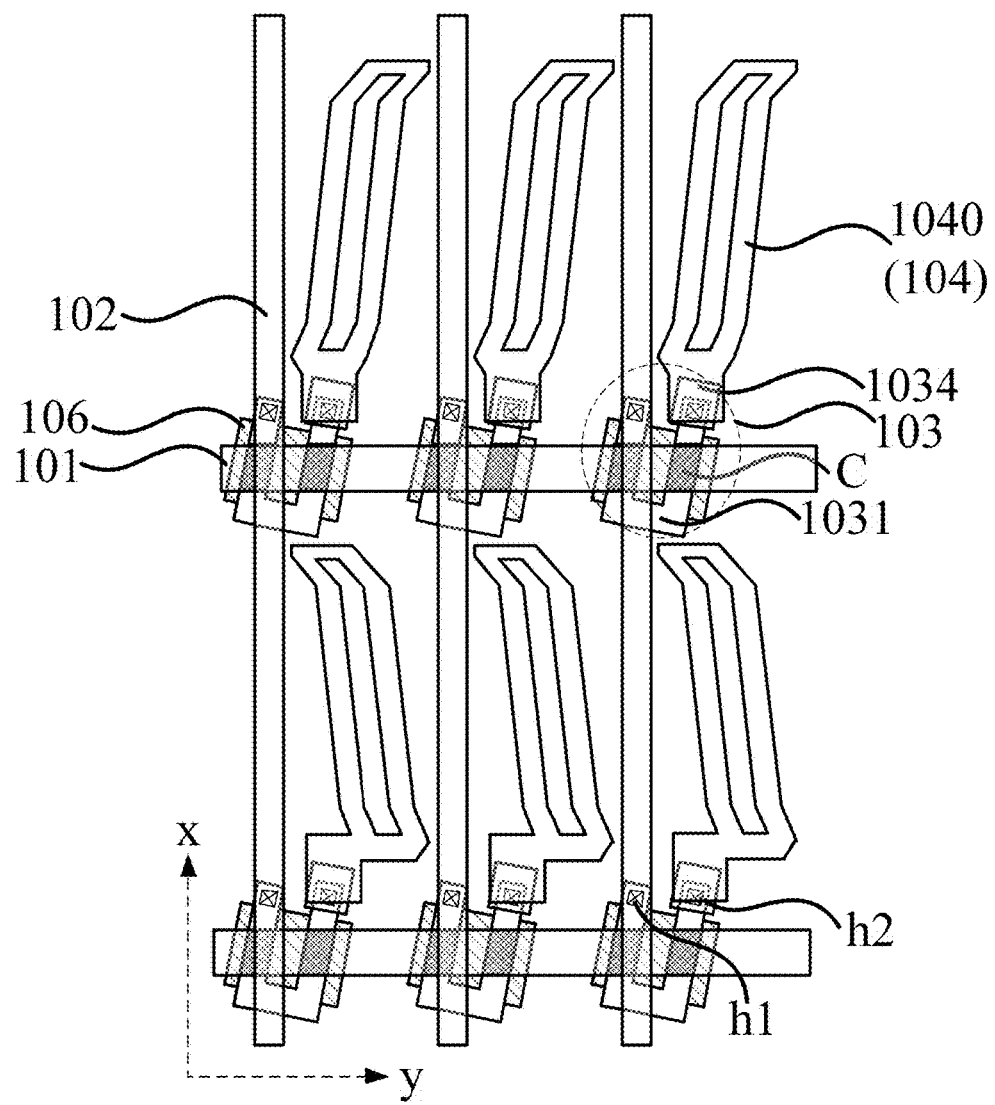
FIG. 21 is a schematic top view of a number of sub-pixels on another array substrate according to an embodiment of the present disclosure.
Figure 22:
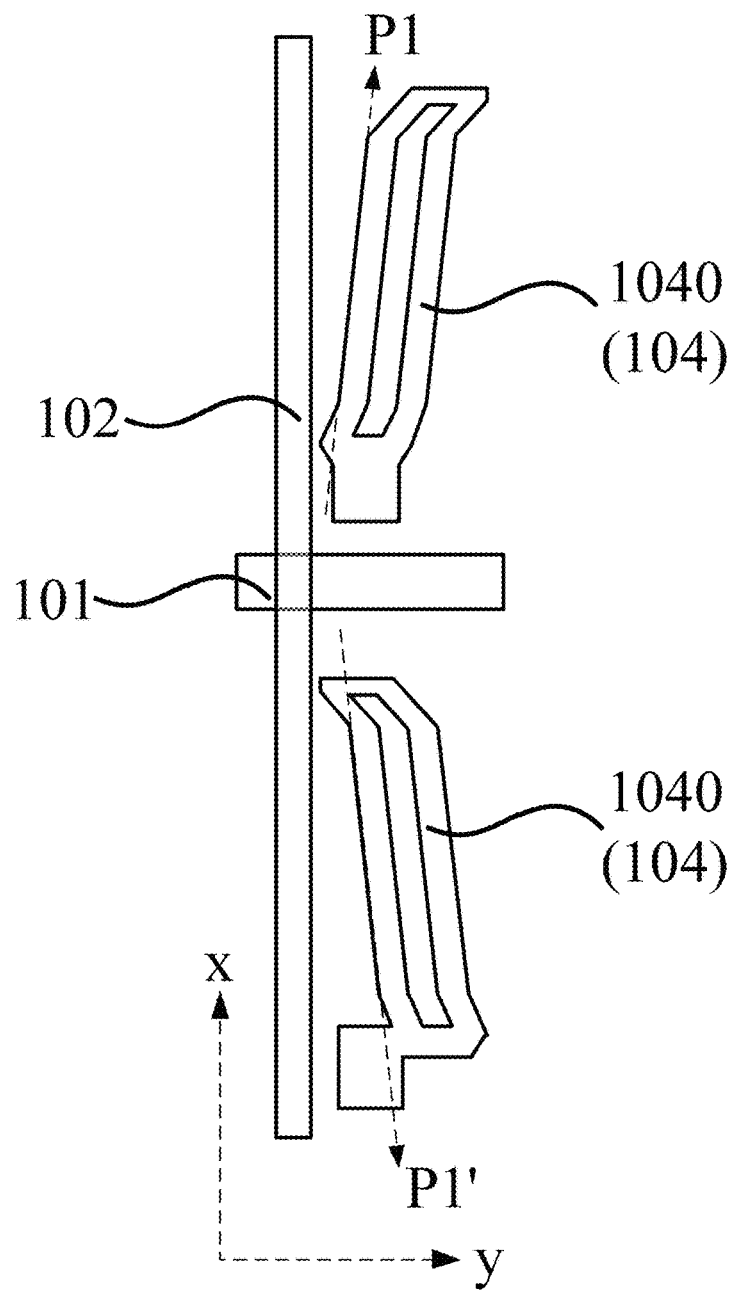
FIG. 22 is a schematic top view of a portion of the film layers in FIG. 21.

Alternatively, on the basis of the above embodiment, the included angles of the extending directions of the stripe-like sub-electrodes of the pixel electrode and/or the common electrode of the two sub-pixels being adjacent in the first direction with respect to the second direction are equal. Taking the sub-electrode is the pixel sub-electrode as an example, as illustrated in FIGS. 21-22, FIG. 21 is a schematic top view of a number of sub-pixels on another array substrate according to the embodiment of the present disclosure, and FIG. 22 is a schematic top view of a portion of the film layers of FIG. 21. In the present embodiment, unlike the embodiment shown in FIG. 12, extending directions P1 and P1' from the pixel sub-electrodes 1040 of the two adjacent sub-pixels next to the same data line form the same angle with the data line. That is, sub-pixels form pseudo-double-domain structure. For the pseudo-double-domain structures, the two adjacent rows of sub-pixels form a pseudo-double-domain structure, rather than form the double-domain structure in one sub-pixel. This structure not only achieves a wide viewing angle compared to the single-domain structure display, it also eliminates the erroneus middle-domain dark area within the sub-pixels of dual-domain structures, thereby improves the transmittance of overall display. At the same time, with respect to the structure of simplifying the pixel electrode and common electrode within the sub-pixel by the two-domain structure, the array substrate may be designed to have a higher resolution according to the actual needs. In the present embodiment simulation studies also showed that when the first angle set at α=10°, the aperture ratio is increased by about 3% as compared with the array substrate in which the extending direction of the channel region is the same as the first direction.

Figure 23:
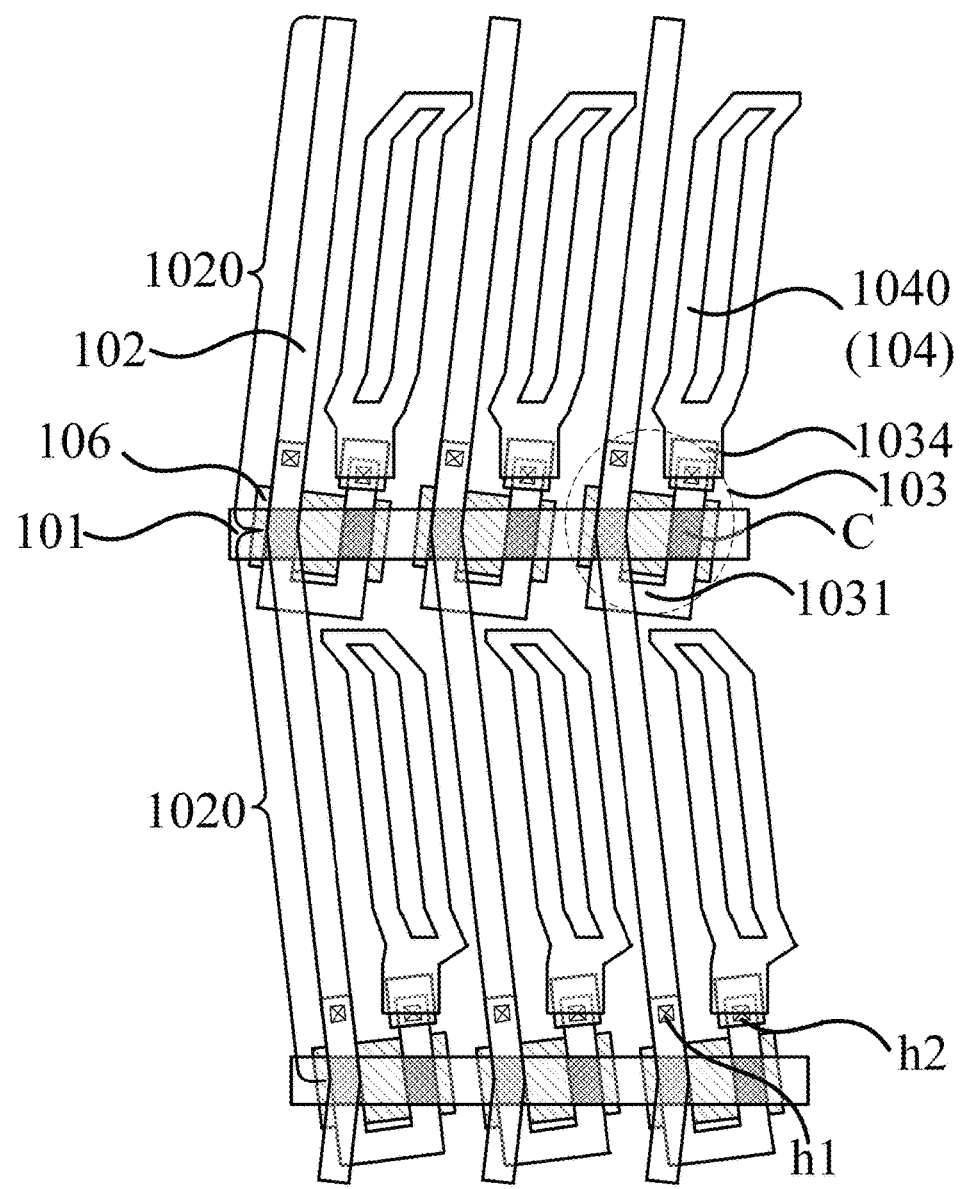
FIG. 23 is a schematic top view of a number of sub-pixels on a another array substrate according to an embodiment of the present disclosure.
Figure 24:
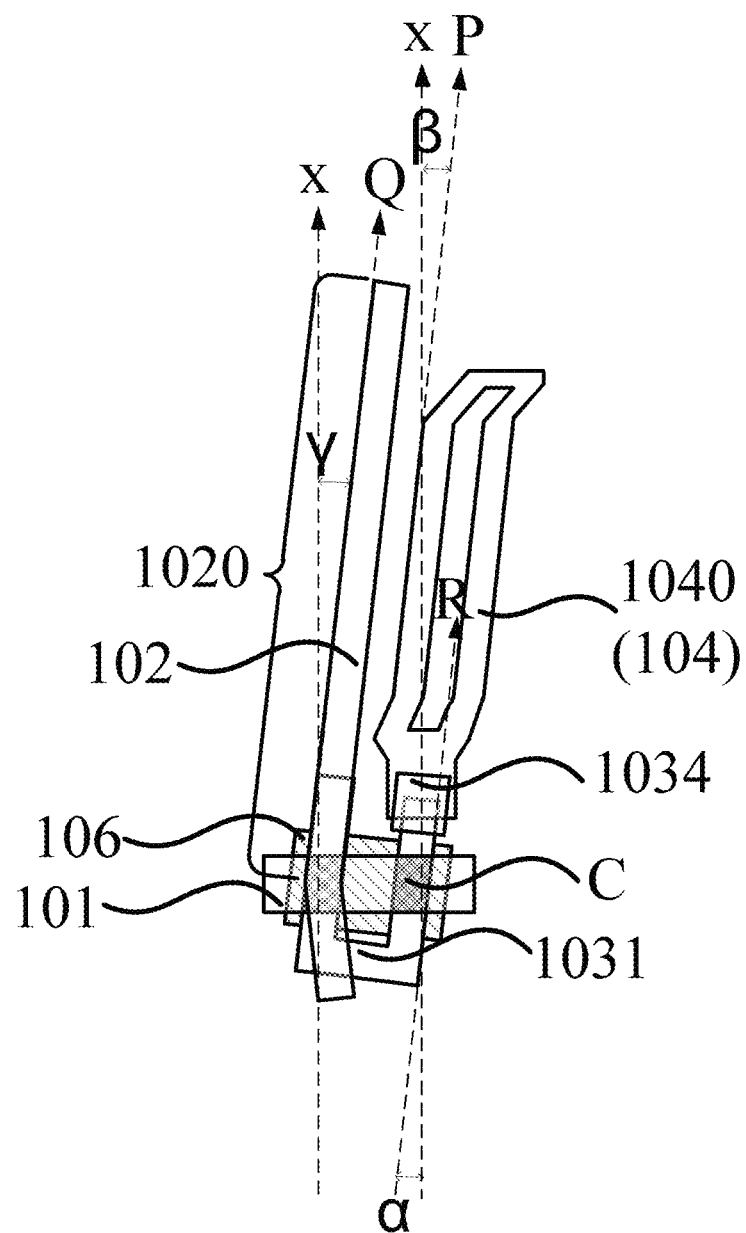
FIG. 24 is a schematic top view of a portion of the film layers in FIG. 23.

Further, on the basis of the pseudo-double-domain structure as illustrated in FIG. 21, a description is given with reference to FIGS. 23 and 24. FIG. 23 is a partial schematic top view of another array substrate according to the embodiment of the present disclosure, and FIG. 24 is a schematic top view of a portion of the film layers of FIG. 23. Each of the plurality of data lines 102 includes a plurality of data line segments 1020, each of the plurality of data line segment corresponds to a respective one of the plurality of sub-pixel and is adjacent to the pixel electrode 104 of the respective one of the plurality of sub-pixels, and a third angle γ, between the extending direction Q of the data line segment 1020 and the first direction x, is greater than 0° and less than or equal to 20° to reduce the coupling difference between the data line 102 and the different positions of the stripe-like sub-electrode. Further, the third angle γ is optionally equal to the second angle β, that is, the each of the plurality of data line segments 1020 extends in the same direction with the stripe-like sub-electrode of the respective one of the plurality of sub-pixels (the pixel sub-electrode 1040 in the present embodiment). In this way, the distance between the data line segment 1020 and the corresponding pixel sub-electrode 1040 can be made consistent, thereby further preventing the coupling difference between the data line 102 and the different positions of the pixel sub-electrode 1040 from affecting the display effect.

Figure 25:
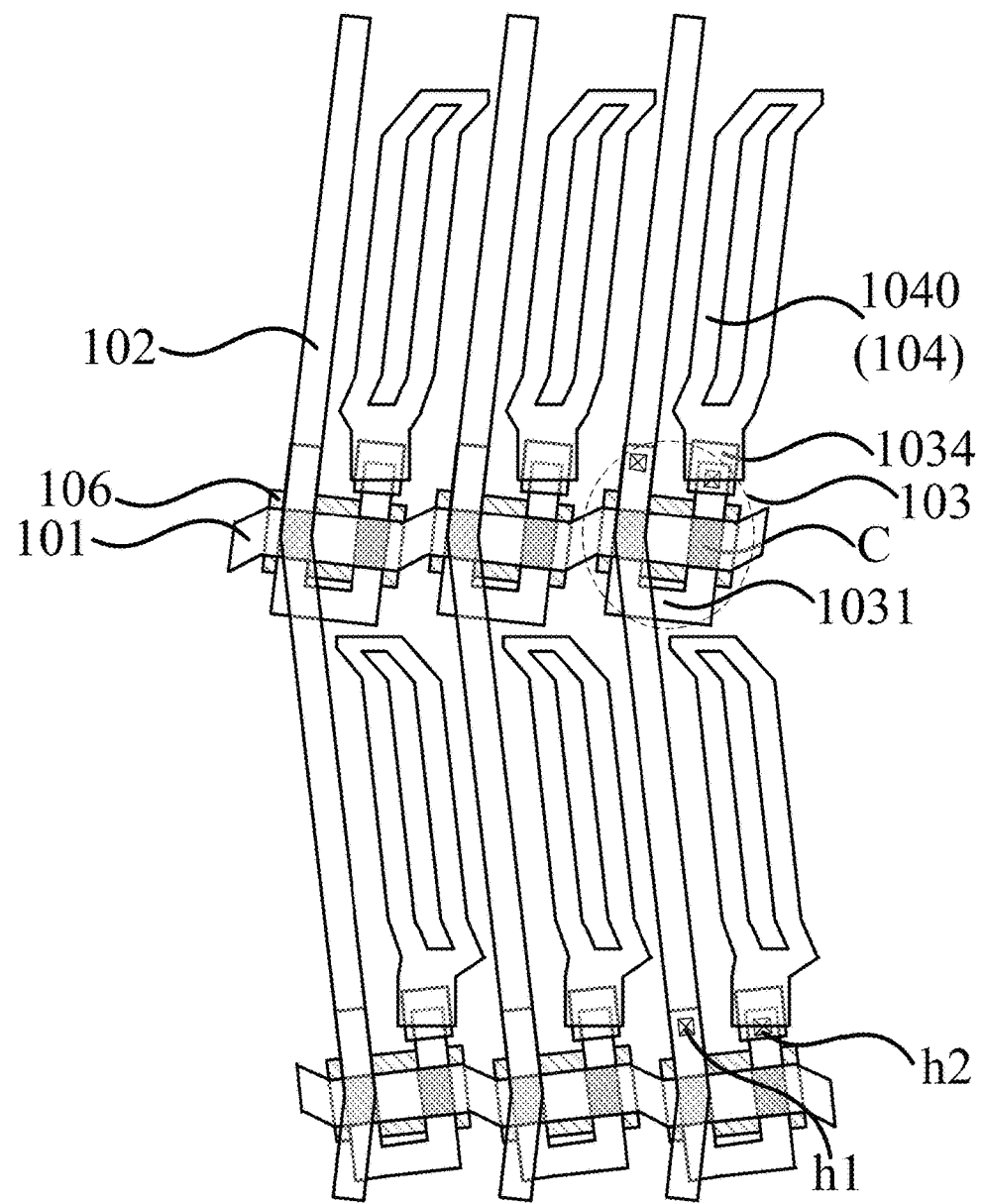
FIG. 25 is a schematic top view of a number of sub-pixels on yet another array substrate according to an embodiment of the present disclosure.
Figure 26:
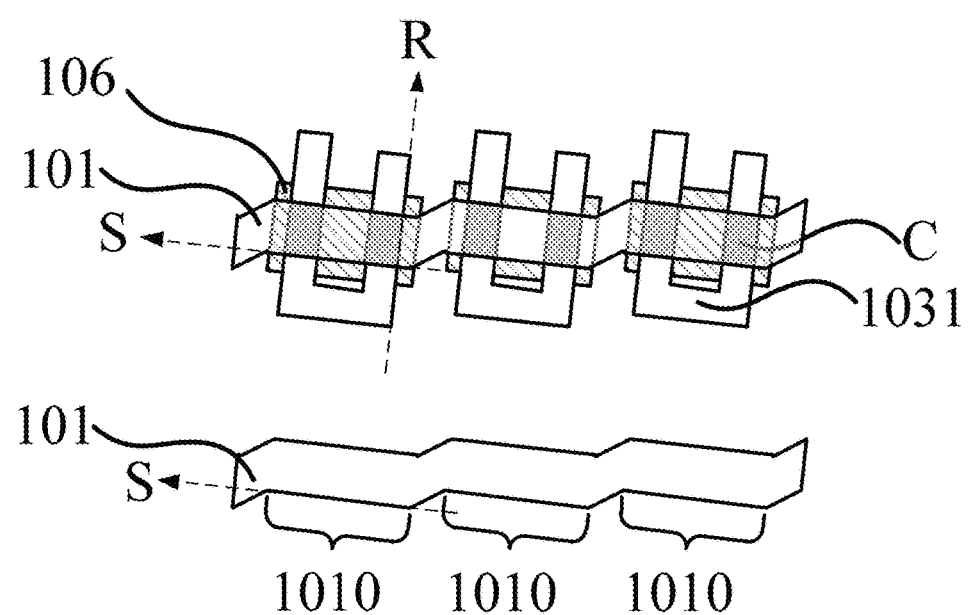
FIG. 26 is a schematic top view of a portion of the film layer in FIG. 25.

On the basis of any of the above embodiments, each of the plurality of scanning lines includes a plurality of scanning line segments, each of the plurality of scanning line segments corresponds to a respective one of the plurality of sub-pixels and is connected to the gate of the thin film transistor of the respective one of the plurality of sub-pixels. The extending direction of each of the plurality of scanning line segments is perpendicular to the extending direction of the channel region of the respective one of the plurality of sub-pixels. By way of example, as shown in FIGS. 25 and 26, FIG. 25 is a schematic top view of a number of sub-pixels on another array substrate according to the embodiment of the present disclosure, and FIG. 26 is a schematic top view of a portion of the film layers in FIG. 25. In the present embodiment, each of the scanning lines 101 includes a plurality of scanning line segments 1010, each of which corresponds to one sub-pixel, and the gate of the thin film transistor 103 of each sub-pixel is connected to the scanning line segment 1010 corresponding to the sub-pixel. The extending direction S of the scanning line segment 1010 is perpendicular to the extending direction R of the channel region C of the corresponding sub-pixel, and this structure enables the channel region C to be maintained as a rectangular shape, which not only reduces the use of the light shield layer material, but also maintains the size of each film layer in the thin film transistor 103 of the array substrate to be consistent with that of each film layer of the conventional thin film transistor in which the extending direction of the channel region is the first direction, in order to simplify the design of the process and reduce the cost.

In the embodiment shown in FIGS. 10-26, each of the light shield layers 106 has a separate light shield pattern, and the orthographic projection of the light shield pattern on the substrate completely covers the orthographic projection of the two channel regions C on the substrate. For a product with a particularly high PPI, the distance between the two channel regions C of the same thin film transistor 103 is very close, and it is possible to simplify the process difficulty by making the two channel regions C to use one common light shield pattern.

Figure 27:
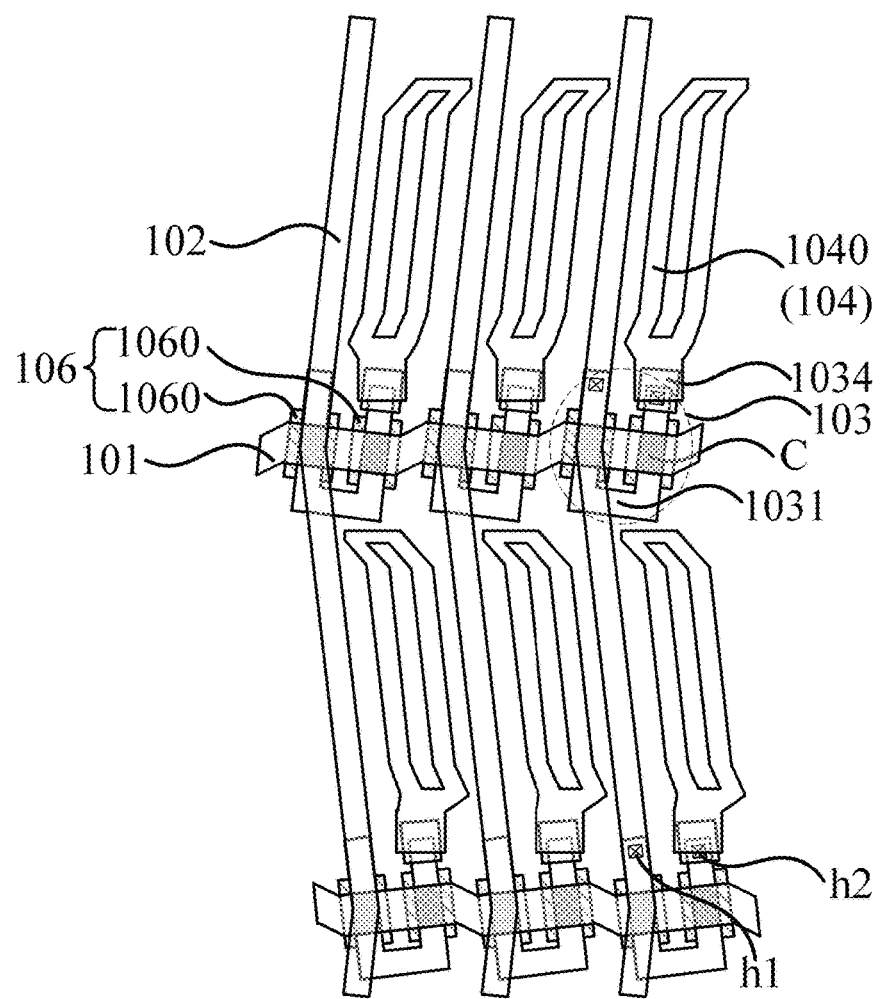
FIG. 27 is a schematic top view of a number of sub-pixels on another array substrate according to an embodiment of the present disclosure.

In another alternative embodiment of the present disclosure, each of the light shield layer may comprise two light shield patterns mutually insulated. The orthographic projection of each of the light shield patterns on the substrate completely covers the orthographic projection of one channel region on the substrate. By way of example, as shown in FIG. 27, a partial schematic top view of another array substrate according to the embodiment of the present disclosure is illustrated. In the present embodiment, unlike the embodiment shown in FIG. 25, each of the light shield layers 106 includes two light shield patterns 1060 mutually insulated. The orthographic projection of each of the light shield patterns 1060 on the substrate completely covers the orthographic projection of one channel region C on the substrate. When the distance between the two channel regions C of the same thin film transistor 103 can satisfy the exposure precision in the process procedures, the light shield patterns 1060 corresponding to the two channel regions C may be independent from each other to further prevent the electrostatic buildup on the light shield pattern 1060 from causing the adverse effects on the performance of the thin film transistor 103.

It is to be understood that the array substrates provided by the embodiments described above have a number of similarities, which are indicated by the same reference signs in the subsequent accompanying drawings and are omitted herein.

Figure 28:
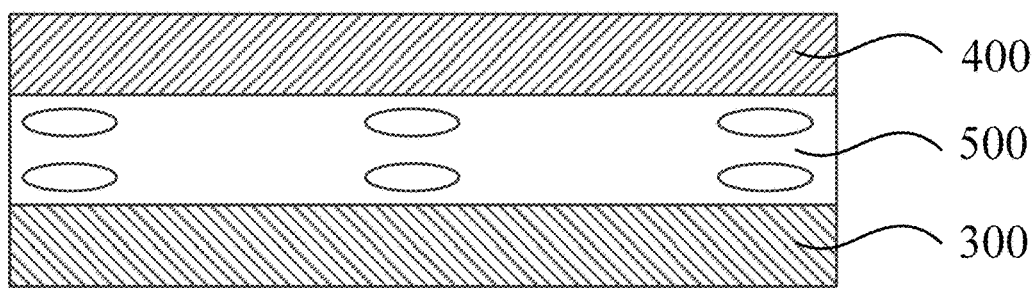
FIG. 28 is a schematic structural view of a display panel according to an embodiment of the present disclosure.

The embodiment of the present disclosure also provides a display panel, and FIG. 28 is a schematic structural view of a display panel according to an embodiment of the present disclosure. With reference to FIG. 28, the display panel includes an array substrate 300 according to any of the embodiments of the present disclosure. The display panel further includes a color film substrate 400 disposed opposite to the array substrate 300 and a liquid crystal layer 500 positioned between the array substrate 300 and the color film substrate 400. In display, an electric field is formed between the pixel electrode and the common electrode on the array substrate 300 to control the rotation of the liquid crystal molecules in the liquid crystal layer 500 to reach the display function.

Figure 29:
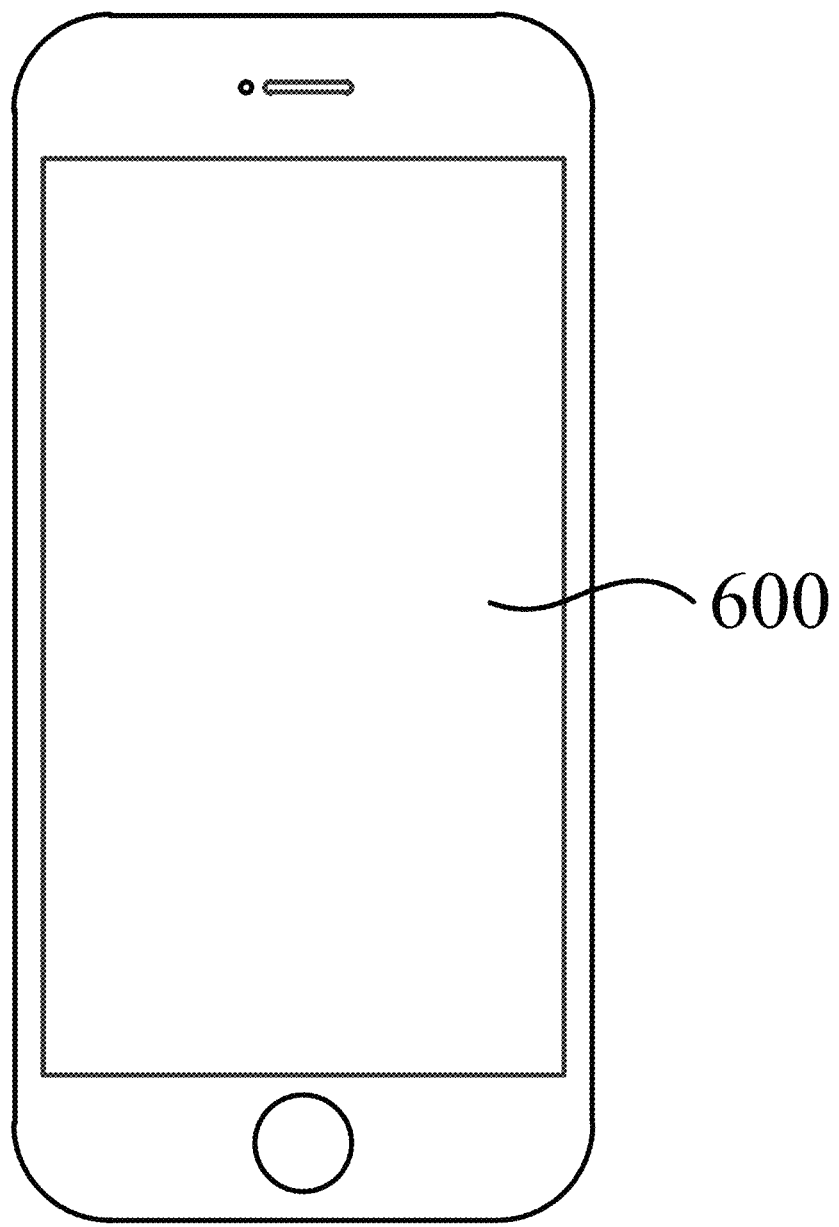
FIG. 29 is a schematic structural view of a display panel according to an embodiment of the present disclosure.

The present disclosure also provides a display device, and FIG. 29 is a schematic structural view of a display panel according to an embodiment of the present disclosure. Referring to FIG. 29, the display device includes a display panel 600 according to any one of the embodiments of the present disclosure. In the present embodiment, the display device is a mobile phone. In another alternative embodiment of the present disclosure, the display device may be any device having a display function such as a tablet computer, a notebook, a display, or the like.

The array substrate, the display panel and the display device according to the embodiments of the present disclosure are described above in detail. The principle and embodiments of the present disclosure have been described in detail with reference to the specific examples, whereas the descriptions of the above embodiments of the present disclosure are merely intended to assist in understanding the method of the present disclosure and gist and concept thereof. Meanwhile, it will be understood by those skilled in the art that some modifications will be made about the embodiments and the scope of applications thereof in light of the idea of the present disclosure, and the contents of the present description should not be understood as limitations to the present disclosure.

What is claimed is:

1. An array substrate comprising:
   a substrate;
   a plurality of scanning lines intersecting and insulated from a plurality of data lines on the substrate, wherein the plurality of data lines extends in a first direction and the plurality of scanning lines extends in a second direction; and
   a plurality of sub-pixels defined by the plurality of scanning lines and the plurality of data lines, wherein the plurality of sub-pixels each comprises a thin film transistor having a gate, a source, a drain, and an active layer, wherein the active layer comprises at least one stripe-shaped portion extending along a first angle to the first direction, wherein the gate is disposed on one side of the active layer facing away from the substrate, wherein the active layer includes a channel region where the stripe-shaped portion of the active layer and the gate overlap in the direction perpendicular to the substrate;
   wherein the channel region comprises two opposite edges parallel to each other in the second direction; and
   wherein the first angle is equal to 10°.

2. The array substrate according to claim 1, the two opposite edges in one of any two adjacent sub-pixels of the plurality of sub-pixels are parallel to the two opposite edges in the other of said two adjacent sub-pixels of the plurality of sub-pixels in the second direction.

3. The array substrate according to claim 1, the sub-pixel further comprises a pixel electrode and a common electrode, wherein either the pixel electrode or the common electrode is a stripe-like electrode extending at a second angle from the first direction, wherein the second angle ranges from 0° to 20°.

4. The array substrate according to claim 3, wherein the first angle equals to the second angle.

5. The array substrate according to claim 3, wherein the second angle ranges from 5° to 10°.

6. The array substrate according to claim 3, wherein the pixel electrode and the common electrode are stacked up, wherein the stripe-like electrode is always at the top of the other electrode.

7. The array substrate according to claim 6, wherein the pixel electrode and the common electrode are stacked up alternately.

8. The array substrate according to claim 3, wherein the second angle of said two adjacent sub-pixels are equal.

9. The array substrate according to claim 3, wherein each of the plurality of data lines comprises a plurality of data line segments, wherein the plurality of data line segments each deviates from the first direction by the second angle of the adjacent sub-pixel.

10. The array substrate according to claim 3, wherein each of the plurality of scanning lines comprises a plurality of scanning line segments, wherein each of the plurality of scanning line segments forms a third angle from the second direction, wherein the third angle equals the second angle of the adjacent sub-pixel.

11. The array substrate according to claim 1, wherein each of the plurality of sub-pixels further comprises a light shield layer positioned between the substrate and the active layer, and the light shield layers of any two adjacent sub-pixels are insulated from each other, and the orthographic projection of the light shield layer on the substrate completely overlaps the orthographic projection of the channel region on the substrate.

12. The array substrate according to claim 11, wherein the active layer comprises two stripe-like portions and a connector to form a U-shape, the two stripe-like portions and the gate overlap to form two channel regions.

13. The array substrate according to claim 12, wherein each of the light shield layers has a light shield pattern, and the orthographic projection of the light shield pattern on the substrate completely overlaps the orthographic projection of the two channel regions on the substrate.

14. The array substrate according to claim 12, wherein each of the light shield layers comprises two light shield patterns mutually insulated, the orthographic projection of each of the light shield patterns on the substrate completely overlaps the orthographic projection of one of the channel regions on the substrate.

15. A display panel comprising an array substrate, the array substrate comprising:
   a substrate;
   a plurality of scanning lines intersecting and insulated from a plurality of data lines on the substrate, wherein the plurality of data lines extends in a first direction and the plurality of scanning lines extends in a second direction; and
   a plurality of sub-pixels defined by the plurality of scanning lines and the plurality of data lines, wherein the plurality of sub-pixels each comprises a thin film transistor having a gate, a source, a drain, and an active layer, wherein the active layer comprises at least one stripe-shaped portion extending along a first angle to the first direction, wherein the gate is disposed on one side of the active layer facing away from the substrate, wherein the active layer includes a channel region where the stripe-shaped portion of the active layer and the gate overlap in the direction perpendicular to the substrate;

wherein the channel region comprises two opposite edges parallel to each other in the second direction; and wherein the first angle is equal to 10°.

16. A display device comprising a display panel, the display panel comprising an array substrate, the array substrate comprising:
a substrate;
a plurality of scanning lines intersecting and insulated from a plurality of data lines on the substrate, wherein the plurality of data lines extends in a first direction and the plurality of scanning lines extends in a second direction; and
a plurality of sub-pixels defined by the plurality of scanning lines and the plurality of data lines, wherein the plurality of sub-pixels each comprises a thin film transistor having a gate, a source, a drain, and an active layer, wherein the active layer comprises at least one stripe-shaped portion extending along a first angle to the first direction, wherein the gate is disposed on one side of the active layer facing away from the substrate, wherein the active layer includes a channel region where the stripe-shaped portion of the active layer and the gate overlap in the direction perpendicular to the substrate;
wherein the channel region comprises two opposite edges parallel to each other in the second direction; and
wherein the first angle is equal to 10°.

* * * * *